United States Patent
Li et al.

(10) Patent No.: US 12,503,606 B2
(45) Date of Patent: Dec. 23, 2025

(54) COMPOSITE PARTICLE AND METHOD OF PRODUCING COMPOSITE PARTICLE

(71) Applicant: DIC Corporation, Tokyo (JP)

(72) Inventors: Meng Li, Qingdao (CN); Shingo Takada, Sakura (JP); Tomoki Dohi, Sakura (JP); Masamichi Hayashi, Sakura (JP); Jianjun Yuan, Sakura (JP); Taro Morimitsu, Kamisu (JP); Shaowei Yang, Qingdao (CN); Cheng Liu, Qingdao (CN); Wei Zhao, Qingdao (CN)

(73) Assignee: DIC Corporation, Tokyo (JP)

( * ) Notice: Subject to any disclaimer, the term of this patent is extended or adjusted under 35 U.S.C. 154(b) by 681 days.

(21) Appl. No.: 17/766,298

(22) PCT Filed: Oct. 9, 2019

(86) PCT No.: PCT/CN2019/110116
§ 371 (c)(1),
(2) Date: Apr. 4, 2022

(87) PCT Pub. No.: WO2021/068124
PCT Pub. Date: Apr. 15, 2021

(65) Prior Publication Data
US 2023/0102456 A1 Mar. 30, 2023

(51) Int. Cl.
*C09C 1/40* (2006.01)
*C09C 3/00* (2006.01)
*C09C 3/04* (2006.01)
*C09C 3/06* (2006.01)

(52) U.S. Cl.
CPC ............ *C09C 1/407* (2013.01); *C09C 3/003* (2013.01); *C09C 3/006* (2013.01); *C09C 3/043* (2013.01); *C09C 3/063* (2013.01); *C01P 2004/01* (2013.01); *C01P 2004/20* (2013.01); *C01P 2004/30* (2013.01)

(58) Field of Classification Search
CPC .... C08K 3/22; C08K 9/02; C09C 1/40; C09C 1/407; C09C 3/003; C09C 3/006; C09C 3/043; C09C 3/063; C09C 3/066; C09D 7/62; C01P 2004/01; C01P 2004/20; C01P 2004/30; C01P 2004/54
See application file for complete search history.

(56) References Cited

U.S. PATENT DOCUMENTS

| | | |
|---|---|---|
| 6,620,508 B2 | 9/2003 | Inoue et al. |
| 10,647,861 B2 | 5/2020 | Suzuki et al. |
| 2003/0022081 A1 | 1/2003 | Inoue et al. |
| 2014/0322536 A1 | 10/2014 | Suzuki et al. |
| 2018/0133116 A1* | 5/2018 | Hioki ................ A61K 8/19 |
| 2019/0185675 A1* | 6/2019 | Yuan ................. C09C 1/0018 |

(Continued)

FOREIGN PATENT DOCUMENTS

| | | |
|---|---|---|
| CN | 110182834 A | 8/2019 |
| JP | H09-59018 A | 3/1997 |

(Continued)

*Primary Examiner* — Shuangyi Abu Ali
(74) *Attorney, Agent, or Firm* — Troutman Pepper Locke LLP; James E. Armstrong, IV; Nicholas J. DiCeglie, Jr.

(57) ABSTRACT

The present invention provides an alumina particle containing molybdenum (Mo) and an inorganic coating part provided on the surface of the alumina particle.

13 Claims, 5 Drawing Sheets

(56) References Cited

U.S. PATENT DOCUMENTS

| | | |
|---|---|---|
| 2020/0231827 A1 | 7/2020 | Suzuki et al. |
| 2020/0231828 A1 | 7/2020 | Suzuki et al. |
| 2022/0243076 A1 | 8/2022 | Suzuki et al. |
| 2022/0251403 A1 | 8/2022 | Suzuki et al. |

FOREIGN PATENT DOCUMENTS

| | | | |
|---|---|---|---|
| JP | 2002-249315 A | | 9/2002 |
| JP | 2003-192338 A | | 7/2003 |
| JP | 2004-300080 A | | 10/2004 |
| JP | 2005-306635 A | | 11/2005 |
| JP | 2009-35430 A | | 2/2009 |
| JP | 4255233 B2 | | 4/2009 |
| JP | 2010-120796 A | | 6/2010 |
| JP | 2014-218425 A | | 11/2014 |
| JP | 2016222501 A | * | 12/2016 |

* cited by examiner

[Fig1]
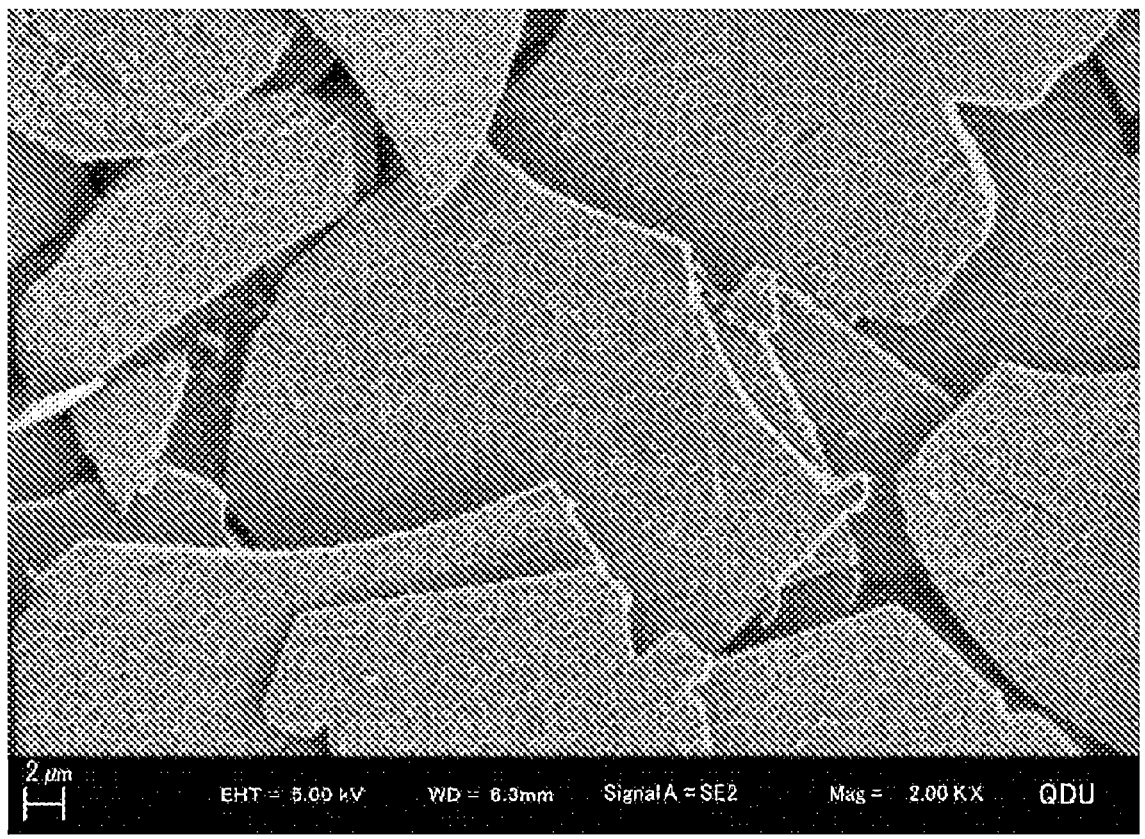

[Fig2]
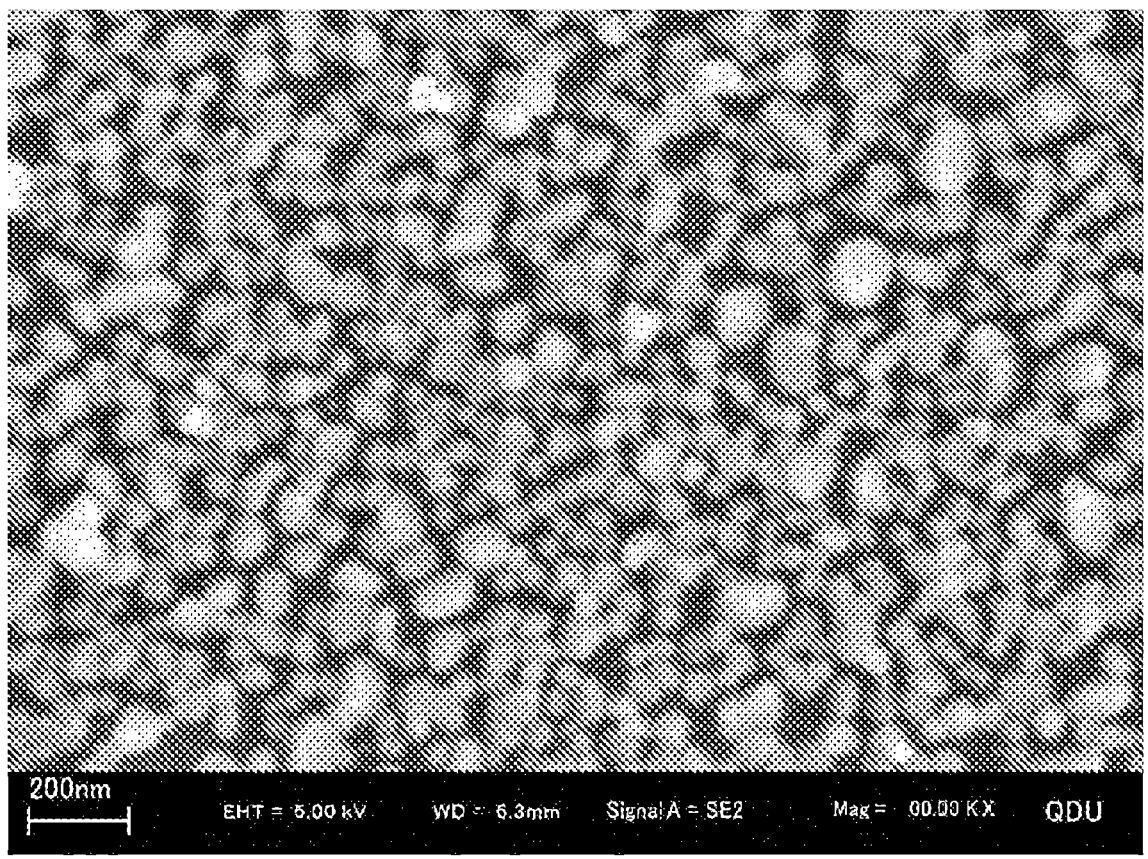

[Fig3]
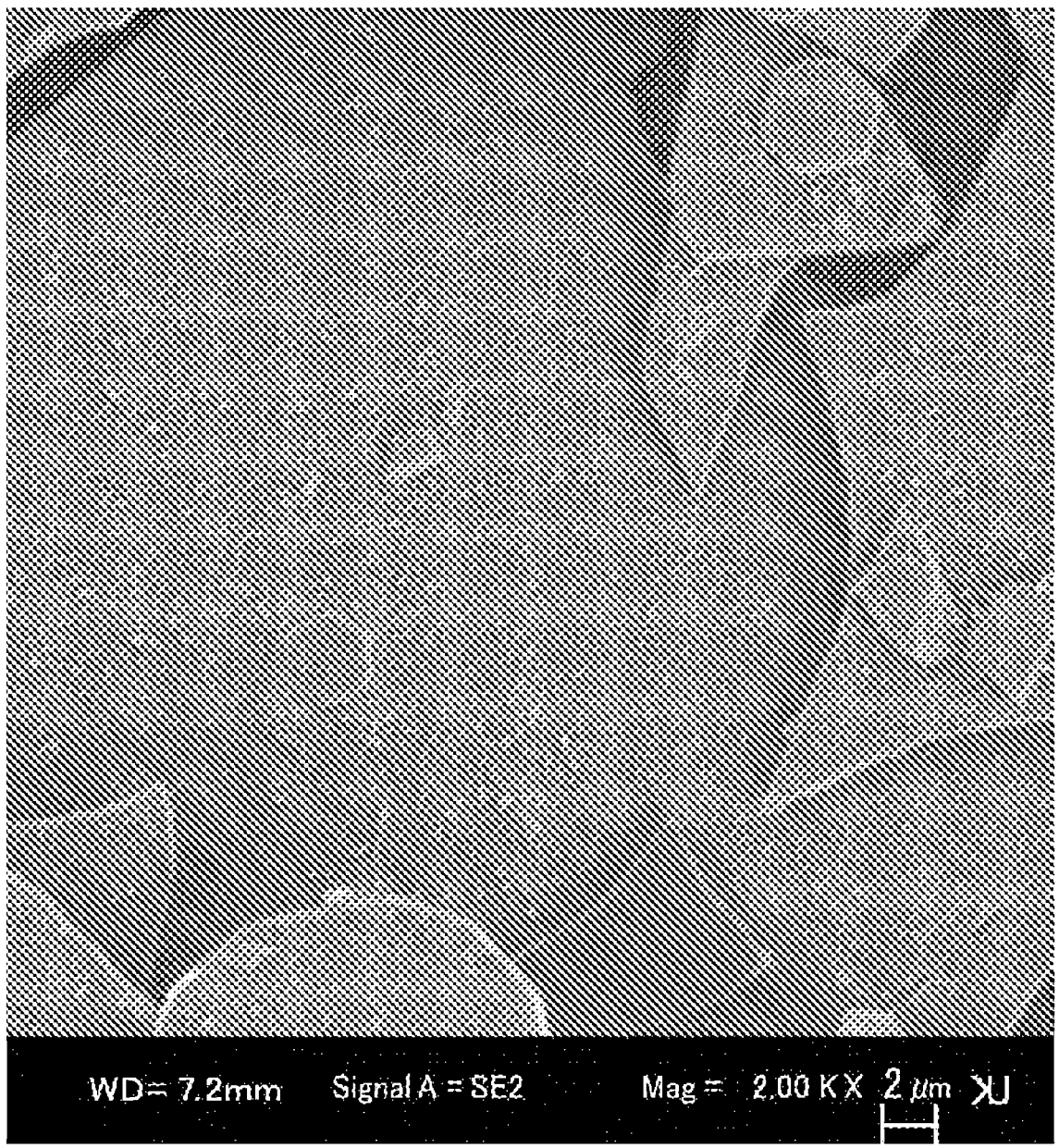

[Fig4]
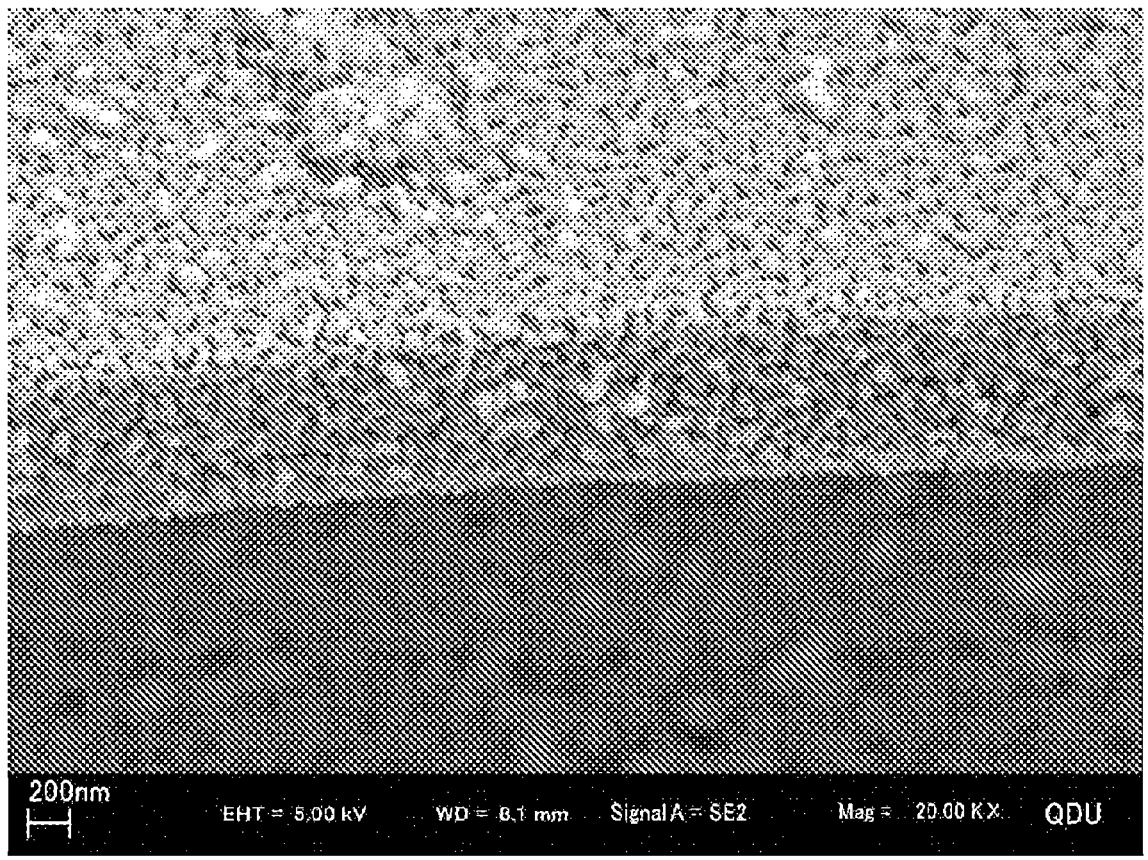

[Fig5]
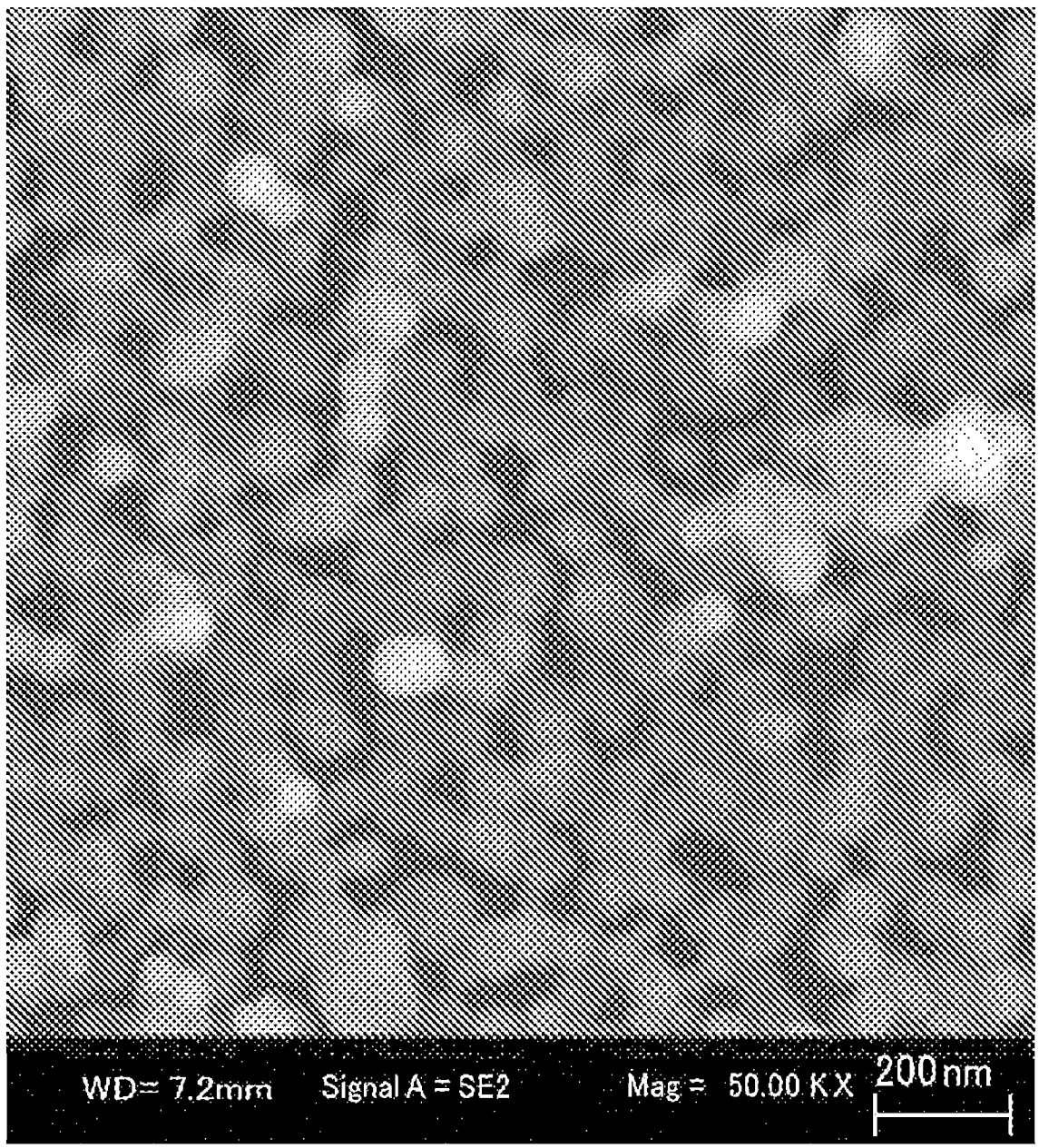

COMPOSITE PARTICLE AND METHOD OF PRODUCING COMPOSITE PARTICLE

TECHNICAL FIELD

The present invention relates to a composite particle and a method of producing a composite particle, and particularly, relates to a composite particle in which a coating part is provided on an alumina particle.

BACKGROUND ART

Alumina particles serving as inorganic fillers are used for various applications. In particular, plate-like alumina particles with a high aspect ratio have more excellent thermal characteristics, optical characteristics, and the like than spherical alumina particles, and further improvements in characteristics have been required.

In the related art, in order to improve the above-described characteristics that plate-like alumina particles intrinsically have, dispersibility, and the like, a variety of plate-like alumina particles having characteristics in shapes such as the major axis or the thickness are known (Patent Document 1 and Patent Document 2). In addition, as a method for controlling the shape for the purpose of increasing the aspect ratio of plate-like alumina particles, a method in which a hydrothermal synthesis is performed by adding a phosphoric acid compound as a shape-controlling agent (Patent Document 3), a method in which firing is performed after the addition of a silicofluoride (Patent Document 4), and the like are known.

Further, a method for manufacturing plate-like alumina in which silicon or a silicon compound including a silicon element is used as a crystal control agent in the manufacturing of the plate-like alumina (Patent Document 5) is also known.

Regarding coated alumina particles, alumina particles in which zirconia nanoparticles are uniformly applied to the surface of the particles are known (Patent Document 6). The coated alumina particles are obtained by applying zirconia nanoparticles having an average particle size of 100 nm or less to the surface of alumina particles having an average particle size of 0.1 μm or more.

In addition, regarding other coated particles, a composite powder which includes a base powder and spherical barium sulfate particles is known (Patent Document 7). And the spherical barium sulfate particles have a number average particle size of 0.5 to 5.0 μm, and are adhered to the surface of the base powder in a protruding shape. The coating rate of spherical barium sulfate particles is 10 to 70% with respect to the surface area of the base powder.

CITATION LIST

Patent Document

[Patent Document 1] Japanese Unexamined Patent Application, First Publication No. 2003-192338
[Patent Document 2] Japanese Unexamined Patent Application, First Publication No. 2002-249315
[Patent Document 3] Japanese Unexamined Patent Application, First Publication No.
[Patent Document 4] Japanese Unexamined Patent Application, First Publication No. 2009-35430
[Patent Document 5] Japanese Unexamined Patent Application, First Publication No. 2016-222501
[Patent Document 6] Japanese Unexamined Patent Application, First Publication No. 2005-306635
[Patent Document 7] Japanese Unexamined Patent Application, First Publication No. 2004-300080

SUMMARY OF INVENTION

Technical Problem

However, none of Patent Documents 1 to 5 discloses anything about coating properties of alumina particles and the coating part.

In addition, Patent Document 6 discloses that a sintered alumina that has a small amount of pores, is dense, and has high toughness and high flexural strength can be obtained, but Patent Document 6 discloses nothing about coating properties of alumina particles and the coating part.

In addition, Patent Document 7 discloses that, if the coating rate of spherical barium sulfate particles is 10 to 70% with respect to the surface area of the base powder, when composite particles are mixed into cosmetics, human skin irregularities or color defects on the surface can corrected and a natural finish can be obtained, but Patent Document 7 discloses nothing about coating properties of alumina particles and the coating part, and there is room for improvement.

The present invention has been made in view of the above circumstances, and an object of the present invention is to provide composite particles having excellent coating properties and a method of producing the composite particles.

Solution to Problem

The inventors conducted extensive studies in order to address the above problems, and as a result, found that, if at least one of mullite and molybdenum is present on the surface of alumina particles served as a substrate constituting composite particles, the coating efficiency when the alumina particles are coated with an inorganic coating part is improved, and the alumina particles are easily coated, and thereby the present invention was completed. That is, the present invention provides the following aspects in order to solve the above problems.

[1] A composite particle comprising
   an alumina particle comprising molybdenum (Mo) and
   an inorganic coating part provided on a surface of the alumina particle.
[2] The composite particle according to [1],
   wherein the inorganic coating part is made of oxide.
[3] The composite particle according to [2],
   wherein the oxide includes one or more selected from the group consisting of titanium oxide, iron oxide and silica.
[4] The composite particle according to [1],
   wherein the inorganic coating part is made of a metal.
[5] The composite particle according to [4],
   wherein the metal includes one or more selected from the group consisting of silver, nickel, copper, gold, and platinum.
[6] The composite particle according to [1],
   wherein the alumina particle further contains one or more selected from the group consisting of silicon and germanium.
[7] The composite particle according to [6],
   wherein the alumina particle contains mullite in a surface layer.

[8] The composite particle according to any one of [1] to [7],
    wherein the composite particle has either a plate-like shape or a polyhedral shape.
[9] The composite particle according to any one of [1] to [8],
    wherein the composite particle has a plate-like shape,
    a thickness of the composite particle is 0.01 μm or more and 5 μm or less,
    a particle size of the composite particle is 0.1 μm or more and 500 μm or less, and
    an aspect ratio of the composite particle is 2 or more and 500 or less.
[10] A paint including the composite particle according to any one of [1] to [9].
[11] A method of producing a composite particle, including:
    producing an alumina particle by firing
        a mixture comprising an aluminum compound containing aluminum element and a molybdenum compound containing molybdenum element, or
        a mixture comprising an aluminum compound containing aluminum element, a molybdenum compound containing molybdenum element, and a shape-controlling agent for controlling a shape of the alumina particle; and
    forming an inorganic coating part on a surface of the alumina particle.
[12] The method of producing a composite particle according to [11],
    wherein the shape-controlling agent includes one or more selected from the group consisting of silicon, a silicon compound containing silicon element, and a germanium compound containing germanium element.
[13] The method of producing a composite particle according to [11] or [12],
    wherein the mixture further includes a potassium compound containing potassium element.
[14] The composite particles according to [11],
    wherein the inorganic coating part is made of an oxide.
[15] The method of producing a composite particle according to [14],
    wherein the oxide include one or more selected from the group consisting of titanium oxide, iron oxide and silica.
[16] The method of producing a composite particle according to [11],
    wherein the inorganic coating part is made of a metal.
[17] The method of producing a composite particle according to [16],
    wherein the metal include one or more selected from the group consisting of silver, nickel, copper, gold, and platinum.

Advantageous Effects of Invention

According to the present invention, it is possible to provide composite particles having excellent coating properties.

BRIEF DESCRIPTION OF DRAWINGS

FIG. 1 is an electron microscope image showing composite particles obtained in Example 1 as an example of a configuration of composite particles according to an embodiment of the present invention.

FIG. 2 is an enlarged image obtained by enlarging the surface of the composite particles in FIG. 1.

FIG. 3 is an electron microscope image showing composite particles obtained in Example 2 as an example of a configuration of composite particles according to an embodiment of the present invention.

FIG. 4 is an enlarged image obtained by enlarging ends of the composite particles in FIG. 3.

FIG. 5 is an enlarged image obtained by enlarging the surface of the composite particles in FIG. 3.

DESCRIPTION OF EMBODIMENTS

Embodiments of the present invention will be described below in detail with reference to the drawings.

First Embodiment

<Composite Particles>

Composite particles according to a first embodiment includes alumina particles containing molybdenum (Mo) and an inorganic coating part provided on the surface of the alumina particles. The alumina particles of the present embodiment have a plate-like shape, and the composite particles also have a plate-like shape. Hereinafter, in the present embodiment, the alumina particles having a plate-like shape will be referred to as "plate-like alumina particles," "plate-like alumina," or simply "alumina particles."

<Plate-Like Alumina Particles>

The expression "plate-like" in the present invention refers to the fact that the aspect ratio obtained by dividing the average particle diameter of the alumina particle by the thickness is 2 or more. In the present specification, "the thickness of the alumina particle" refers to the arithmetic average value of the measured thicknesses of at least 50 plate-like alumina particles randomly selected from an image obtained by a scanning electron microscope (SEM). In addition, "the average particle diameter of the alumina particle" refers to a value computed as the volume-based median radius $D_{50}$ from a volume-based cumulative particle size distribution measured by a laser diffraction particle diameter measurement apparatus.

For the alumina particle of the embodiment, the conditions of the thickness, the particle diameter, and the aspect ratio described below can be combined in any manner as long as the alumina particle has a plate-like shape. In addition, the combination of the upper limit and the lower limit of a numerical range exemplified under these conditions can be set freely.

The thickness of the plate-like alumina particles is preferably 0.01 μm or more and 5 μm or less, preferably 0.03 μm or more and 5 μm or less, preferably 0.1 μm or more and 5 μm or less, more preferably 0.3 μm or more and 3 μm or less, and most preferably 0.5 μm or more and 1 μm or less.

When plate-like alumina particles having a larger particle size are used, the thickness is preferably 3 μm or more, and the thickness is more preferably 5 μm or more and 60 μm or less.

The alumina particle having the above-described thickness is preferable due to the high aspect ratio and the excellent mechanical strength.

The average particle size ($D_{50}$) of plate-like alumina particles is preferably 0.1 μm or more and 500 μm or less, more preferably 0.5 μm or more and 100 μm or less, and most preferably 1 μm or more and 50 μm or less.

When plate-like alumina particles having a larger particle size are used, the average particle size ($D_{50}$) is preferably 10

μm or more, more preferably 20 μm or more, more preferably 22 μm or more, most preferably 25 μm or more, and particularly preferably 31 μm or more. The upper limit value of the average particle size is not particularly limited, and as an example, the average particle size ($D_{50}$) of plate-like alumina particles according to the embodiment is preferably 10 μm or more and 500 μm or less, preferably 20 μm or more and 300 μm or less, more preferably 22 μm or more and 100 μm or less, most preferably 25 μm or more and 100 μm or less, and particularly preferably 31 μm or more and 50 μm or less.

An alumina particle having an average particle diameter ($D_{50}$) of the above-described lower limit value or more particularly has excellent brilliance since the area of a light reflection surface is large. In addition, an alumina particle having an average particle diameter ($D_{50}$) of the above-described upper limit value or less is optimal for the use as a filler.

The aspect ratio, which is a ratio of the average particle diameter to the thickness, of the plate-like alumina particles is preferably 2 or more and 500 or less, preferably 5 or more and 500 or less, preferably 15 or more and 500 or less, more preferably 10 or more and 300 or less, more preferably 17 or more and 300 or less, and most preferably 33 or more and 100 or less. When the aspect ratio of the plate-like alumina particle is 2 or more, the plate-like alumina particle is capable of having a two-dimensional formulation characteristic, which is preferable, and, when the aspect ratio of the plate-like alumina particle is 500 or less, the mechanical strength is excellent, which is preferable. When the aspect ratio is 15 or more, the plate-like alumina particle becomes highly bright when used as a pigment, which is preferable.

When plate-like alumina particles having a larger particle size are used, the aspect ratio which is a ratio of the average particle diameter to the thickness is preferably 2 or more and 50 or less and more preferably 3 or more and 30 or less.

The plate-like alumina particle according to the embodiment may have a disc shape or an oval plate-like shape, but the particle shape is preferably, for example, a polygonal plate-like shape from the viewpoint of handleability or ease in manufacturing.

The plate-like alumina particle according to the embodiment may be obtained by any kind of manufacturing method, but is preferably obtained by firing an aluminum compound in the presence of a molybdenum compound and a shape-controlling agent from the viewpoint that the aspect ratio is higher, and dispersibility and productivity are further improved. As the shape-controlling agent, at least one kind selected from the group consisting of silicon, a silicon compound, and a germanium compound is preferably used. The shape-controlling agent serves as a Si supply source for mullite described below, and thus a silicon or silicon compound including a silicon element is more preferably used.

In the above-described manufacturing method, the molybdenum compound is used as a flux agent. Hereinafter, in the present specification, the manufacturing method in which the molybdenum compound is used as the flux agent will be simply referred to as a "flux method" in some cases. The flux method will be described below in detail. It is considered that, due to the firing, the molybdenum compound reacts with the aluminum compound at a high temperature and forms aluminum molybdate, and then the molybdenum compound is incorporated into the plate-like alumina particle while this aluminum molybdate is further decomposed into alumina and molybdenum oxide at a higher temperature. It is also possible to sublimate, collect, and reuse the molybdenum oxide.

In a case where the plate-like alumina particle of the embodiment includes mullite in the surface layer, the mullite is considered to be formed in the surface layer of the plate-like alumina particle by a reaction between the compound including silicon or a silicon element formulated as the shape-controlling agent and the aluminum compound through molybdenum in the above-described process. Regarding a generation mechanism of mullite, in more detail, it is considered that, on a plate surface of alumina, Mo—O—Si is formed by a reaction between molybdenum and a Si atom, and Mo—O—Al is formed by a reaction between molybdenum and an Al atom, and the firing at a high temperature desorbs Mo and forms mullite having a Si—O—Al bond.

Molybdenum oxide that is not incorporated into the plate-like aluminum particle is preferably collected and reused by sublimation. In such a case, it is possible to reduce the amount of molybdenum oxide being attached to the surface of the plate-like alumina, and as a result, it becomes possible to not to mix molybdenum oxide into a binder when dispersed into a medium to be dispersed such as an organic binder such as a resin or an inorganic binder such as glass, and to impart the intrinsic properties of plate-like alumina to the maximum extent.

In the present specification, a substance that can be sublimated and a substance that cannot be sublimated in a manufacturing method described below will be respectively called the flux agent and the shape-controlling agent.

Since an alumina particle has a high α-crystallization rate and has the euhedral crystal, the use of molybdenum and the shape-controlling agent in the manufacturing of the plate-like alumina particle enables the realization of excellent dispersibility, excellent mechanical strength, a high thermal conduction property, and brilliance.

In a case where the plate-like alumina particle of the embodiment includes mullite in the surface layer, the amount of the mullite generated in the surface layer of the plate-like alumina particle can be controlled by adjusting the percentages of the molybdenum compound and the shape-controlling agent. Particularly, the amount of the mullite generated in the surface layer of the plate-like alumina particle can be controlled by adjusting the percentage of the silicon or silicon compound including a silicon element that is used as the shape-controlling agent. A preferable value of the amount of the mullite generated in the surface layer of the plate-like alumina particle and a preferable percentage of the raw material used will be described below.

From the viewpoint of improving brilliance, the plate-like alumina particle of the embodiment is preferably a plate-like alumina particle having an aspect ratio of 5 to 500, in which, in a solid state $^{27}$Al NMR analysis, a longitudinal relaxation time $T_1$ with respect to a peak of six-fold coordinated aluminum at 10 to 30 ppm at a strength of static magnetic field of 14.1 T is five seconds or longer.

The longitudinal relaxation time $T_1$ being five seconds or longer means that the crystallinity of the plate-like alumina particle is high. There is a report that, when the longitudinal relaxation time in a solid state is long, the symmetry of crystals is favorable, and the crystallinity is high (The report is "Susumu Kitagawa et al.: "Solutions of Polynuclear Species and Solid NMR" in Japan Society of Coordination Chemistry Library 4, Sankyo Shuppan Co., Ltd., pp 80 to 82.).

In the plate-like alumina particle of the embodiment, the longitudinal relaxation time $T_1$ is preferably five seconds or longer, more preferably six seconds or longer, and still more preferably seven seconds or longer.

In the plate-like alumina particle of the embodiment, the upper limit value of the longitudinal relaxation time $T_1$ is not particularly limited and may be, for example, 22 seconds or shorter, 15 seconds or shorter, or 12 seconds or shorter.

An example of the numerical range of the longitudinal relaxation time $T_1$ exemplified above may be five seconds or longer and 22 seconds or shorter, six seconds or longer and 15 seconds or shorter, or seven seconds or longer and 12 seconds or shorter.

In the plate-like alumina particle of the embodiment, in a solid state $^{27}Al$ NMR analysis, the peak of four-fold coordinated aluminum at 60 to 90 ppm at a strength of static magnetic field of 14.1 T is preferably not detected. Such a plate-like alumina particle is considered not to easily allow the occurrence of breakage or dropout originated from the distortion of the symmetry of crystals, which is due to the inclusion of crystals having different coordination numbers. Therefore, the plate-like alumina particle tends to be superior in terms of shape stability.

In the related art, it is common to evaluate the degree of crystallinity of an inorganic substance by using the result of an XRD analysis or the like. However, the present inventors found that an analysis result, which is obtained by using the longitudinal relaxation time $T_1$ as an index for the evaluation of the crystallinity of an alumina particle, has a better accuracy than that of an XRD analysis in the related art. For the plate-like alumina particle according to the embodiment, it can be said that the crystallinity of the alumina particle is high when the longitudinal relaxation time $T_1$ is five seconds or longer. That is, it is considered that since the plate-like alumina particle according to the embodiment probably has a high crystallinity, it is possible to improve light reflection by suppressing scattered reflection on a crystal face, and as a result, the plate-like alumina particle having excellent brilliance can be obtained.

Further, the present inventors found that the value of the longitudinal relaxation time $T_1$, the shape retention rate of the plate-like alumina particle, and the process stability of a resin composition extremely highly correlate with one another. In particular, in plate-like alumina particles having an average particle size of 10 μm or less and an aspect ratio of 30 or less (for example, Examples 1 and 2), there is a significant correlation between the value of the longitudinal relaxation time $T_1$ and the shape retention rate of the plate-like alumina particles, and between the value of the longitudinal relaxation time $T_1$ and the processability stability of the resin composition. When a resin composition is manufactured by formulating the plate-like alumina particle of the embodiment having a longitudinal relaxation time $T_1$ of five seconds or longer into a resin, the resin composition also has an advantage of a favorable process stability and ease in being processed into a desired shape. The plate-like alumina particle according to the embodiment has a long value as the longitudinal relaxation time $T_1$ and thus has a high crystallinity. Therefore, it is considered that, due to the high crystallinity of alumina, the strength of the particle is high, and, when the resin and the plate-like alumina particle are mixed together in a process for manufacturing the resin composition, a plate does not easily fracture, and, further, probably due to the high crystallinity of alumina, unevenness on the particle surface is slight, and the plate-like alumina particle is excellent in terms of adhesion to the resin. For the above-described reasons, the plate-like alumina particle according to the embodiment is considered to provide a favorable process stability to a resin composition. According to the plate-like alumina particle of the embodiment, the intrinsic performance of the plate-like alumina particle is favorably exhibited even in the case of formulating the plate-like alumina particle into the resin composition or the like.

In the related art, it was more difficult to obtain an alumina particle having a high crystallinity from a plate-like alumina particle than a spherical alumina particle. This is considered to be because, for the plate-like alumina particle, unlike the spherical alumina particle, it is necessary to bias the orientation of crystal growth in the manufacturing process of the alumina particle.

In contrast, the plate-like alumina particle according to the embodiment which satisfies the value of the longitudinal relaxation time $T_1$ has a high crystallinity while having a plate-like shape. Therefore, the plate-like alumina particle is an extremely useful alumina particle having an advantage of a plate-like alumina particle such as the exhibition of an excellent thermal conduction property and, further, having a high shape retention rate and a favorable process stability of the resin composition.

In addition, regarding the plate-like alumina particle of the embodiment, in which a ratio I(006)/I(113) of a peak intensity I(006) at 2θ=41.6±0.3 degrees which corresponds to a (006) face to a peak intensity I(113) at 2θ=43.3±0.3 degrees which corresponds to a (113) face of diffraction peaks obtained by X-ray diffraction measurement using a Cu-Kα ray (hereinafter, I(006)/I(113) will be abbreviated as the (006/113) ratio) is preferably 0.2 or more and 30 or less, more preferably 1 or more and 20 or less, most preferably 3 or more and 10 or less, and particularly preferably 7.5 or more and 10 or less. The plate-like alumina particles in this case have, for example, an average particle size ($D_{50}$) of 10 μm or more and a thickness of 0.1 μm or more.

The value of the (006/113) ratio being large is understood to mean that the ratio of the (006) face to the (113) face is large and to mean that a face corresponding to a crystal in the orientation of the (006) face significantly develops in a flat plate-shaped alumina particle. Since not only such a flat plate-shaped alumina particle has a large area of an upper surface or a lower surface developed on a plate-like surface of the plate-like alumina, and as result, the visibility of reflected light reflected by the upper surface or the lower surface increases; but also the formation of a face corresponding to a crystal in the orientation of the (113) face is suppressed, high brilliance is exhibited in spite of a small mass per particle.

The pH of the plate-like alumina particle according to the embodiment at an isoelectric point is, for example, in a range of 2 to 6, preferably in a range of 2.5 to 5, and more preferably in a range of 3 to 4. The plate-like alumina particle having a pH at the isoelectric point in the above-described range has a strong electrostatic repulsive force, is capable of enhancing dispersion stability at the time of being formulated into the above-described medium to be dispersed, and further facilitates reforming by a surface treatment by a coupling treatment agent which is intended to further improve performance.

The value of the pH at the isoelectric point can be obtained by (i) preparing a sample for measurement by obtaining a supernatant liquid of a mixture which is obtained by stirring a sample (20 mg) and a 10 mM KCL aqueous solution (10 mL) for three minutes in a stirring and defoaming mode using an AWATORI RENTARO (Thinky Corporation, ARE-310), and leaving the mixture to stand for five minutes; (ii) measuring a zeta potential (applied voltage of 100 V, Monomod 1 mode) in a pH range of up to 2 in a zeta potential measurement apparatus (Malvern Panalytical Ltd., ZETASIZER NANO ZSP) by adding 0.1 N HCl to the sample by an automatic titration apparatus; and (iii) evaluating the pH at the isoelectric point at which the potential reaches zero.

In the plate-like alumina particle according to the embodiment, for example, the density is 3.70 g/cm$^3$ or more and 4.10 g/cm$^3$ or less, the density is preferably 3.72 g/cm$^3$ or more and 4.10 g/cm$^3$ or less, and the density is more preferably 3.80 g/cm$^3$ or more and 4.10 g/cm$^3$ or less.

The density can be measured by using a dry-type automatic density meter AccuPyc II 1330 produced by MICROMERITICS INSTRUMENT CORP. under the conditions of a measurement temperature of 25° C. and the use of helium as a carrier gas after a pretreatment of the plate-like alumina particle is performed under the conditions of 300° C. and three hours.

[Alumina]

"Alumina" included in the plate-like alumina particle according to the embodiment is aluminum oxide and may be transition alumina in a variety of crystal forms of, for example, γ, δ, θ, k, or the like or may include an alumina hydrate in transition alumina. However, alumina preferably has, basically, an α-crystal form (α-type) from the viewpoint of further improved mechanical strength or optical characteristics. The α-crystal form is a dense crystal structure of alumina and is advantageous in improving the mechanical strength or optical characteristics of the plate-like alumina of the embodiment.

An α crystallization rate is preferably as close to 100% as possible since it becomes easy to exhibit the intrinsic properties of the α-crystal form. The α crystallization rate of the plate-like alumina particle according to the embodiment is, for example, 90% or more, preferably 95% or more, and more preferably 99% or more.

[Silicon and Germanium]

The plate-like alumina particle according to the embodiment may include silicon and/or germanium.

The silicon or germanium may be derived from silicon, a silicon compound, and/or a germanium compound that can be used as the shape-controlling agent. In the case of using the silicon or germanium, in the manufacturing method described below, it is possible to manufacture a plate-like alumina particle having excellent brilliance.

(Silicon)

The plate-like alumina particle according to the embodiment may include silicon. The plate-like alumina particle according to the embodiment may contain silicon in the surface layer.

In this regard, "surface layer" means a layer within 10 nm from the surface of the plate-like alumina particle according to the embodiment. This distance corresponds to the detection depth of XPS used for the measurement in the example.

In the plate-like alumina particle according to the embodiment, silicon may be unevenly distributed in the surface layer. In this regard, "being unevenly distributed in the surface layer" means a state in which the mass of silicon per unit volume of the surface layer is greater than the mass of silicon per unit volume of the portion other than the surface layer. Uneven distribution of silicon in the surface layer can be identified by comparing the result of surface analysis based on XPS and the result of overall analysis based on XRF.

Silicon contained in the plate-like alumina particle according to the embodiment may be a silicon simple substance or be silicon in the silicon compound. The plate-like alumina particle according to the embodiment may contain at least one selected from a group consisting of mullite, Si, SiO$_2$, SiO, and aluminum silicate produced by reacting with alumina as the silicon or silicon compound, and the above-described substance may be included in the surface layer. Mullite will be described below.

In the case of using silicon or a silicon compound including a silicon element as the shape-controlling agent, from the plate-like alumina particle according to the embodiment, Si can be detected by an XRF analysis. In the plate-like alumina particle according to the embodiment, the molar ratio [Si]/[Al] of Si to Al acquired by an XRF analysis is, for example, 0.04 or less, preferably 0.035 or less, and more preferably 0.02 or less.

In addition, the value of the molar ratio [Si]/[Al] is not particularly limited and is, for example, 0.003 or more, preferably 0.004 or more, and more preferably 0.005 or more.

In the plate-like alumina particle according to the embodiment, the molar ratio [Si]/[Al] of Si to Al acquired by an XRF analysis is, for example, 0.003 or more and 0.04 or less, preferably 0.004 or more and 0.035 or less, and more preferably 0.005 or more and 0.02 or less.

A plate-like alumina particle having a value of the molar ratio [Si]/[Al] of Si to Al acquired by an XRF analysis in the above-described range satisfies the above-described value of the (006/113) ratio and has more preferable brilliance, and the plate-like shape is favorably formed. In addition, an attachment substance is not easily attached to the surface of the plate-like alumina particle, and the quality is excellent. This attachment substance is regarded as a SiO$_2$ grain and is considered to be generated from Si that becomes excessive due to the saturation of the generation of mullite in the surface layer of the plate-like alumina particle.

When plate-like alumina particles having a larger particle size are used, in the plate-like alumina particles, the molar ratio [Si]/[Al] of Si to Al acquired through XRF analysis is preferably 0.0003 or more and 0.01 or less, preferably 0.0005 or more and 0.0025 or less, and more preferably 0.0006 or more and 0.001 or less.

The plate-like alumina particle according to the embodiment is capable of including silicon that corresponds to the silicon or silicon compound including a silicon element which is used in the manufacturing method thereof. The content of silicon relative to 100% by mass of the plate-like alumina particle according to the embodiment is preferably 10% by mass or less, more preferably 0.001% to 5% by mass, still more preferably 0.01% to 4% by mass, and particularly preferably 0.3% to 2.5% by mass in a form of silicon dioxide.

When the content of silicon is in the above-described range, the plate-like alumina particle satisfies the above-described value of the (006/113) ratio and has more preferable brilliance, and the plate-like shape is favorably formed. In addition, the attachment substance regarded as a SiO$_2$ grain is not easily attached to the surface of the plate-like alumina particle, and the quality is excellent.

When plate-like alumina particles having a larger particle size are used, the amount of silicon with respect to 100 mass % of the plate-like alumina particles is, in terms of silicon dioxide, preferably 10 mass % or less, more preferably 0.001 to 3 mass %, most preferably 0.01 to 1 mass %, and particularly preferably 0.03 to 0.3 mass %.

(Mullite)

The plate-like alumina particles according to the embodiment may contain mullite. It is thought that, when the surface layer of the plate-like alumina particles contains mullite, the selectivity of an inorganic material constituting an inorganic coating part is improved, and the inorganic coating part can be efficiently formed in the plate-like alumina particles.

When mullite is included in the surface layer of the plate-like alumina particle, a significant wear reduction of an apparatus is developed. "Mullite" that the plate-like alumina particle according to the embodiment may include in the surface layer is a composite oxide of Al and Si and represented by $Al_xSi_yO_z$, but the values of x, y, and z are not particularly limited. A more preferable range is $Al_2Si_1O_5$ to $Al_6Si_2O_{13}$. In the examples described below, the XRD peak intensities of plate-like alumina particles including $Al_{2.85}Si_1O_{6.3}$, $Al_3Si_1O_{6.5}$, $Al_{3.67}Si_1O_{7.5}$, $Al_4Si_1O_8$, or $Al_6Si_2O_{13}$ are confirmed. The plate-like alumina particle according to the embodiment may include at least one kind of compound selected from the group consisting of $Al_{2.85}Si_1O_{6.3}$, $Al_3Si_1O_{6.5}$, $Al_{3.67}Si_1O_{7.5}$, $Al_4Si_1O_8$, and $Al_6Si_2O_{13}$ in the surface layer. Here, the "surface layer" refers to a region 10 nm or less from the surface of the plate-like alumina particle according to the embodiment. This distance corresponds to the detection depth of XPS used for measurement in the examples.

In the plate-like alumina particle according to the embodiment, the mullite is preferably unevenly distributed in the surface layer. Here, the expression "unevenly distributed in the surface layer" refers to a state in which the mass of mullite per unit volume in the surface layer is greater than the mass of mullite per unit volume in a region except for the surface layer. Mullite being unevenly distributed in the surface layer can be determined by comparing the results of a surface analysis by XPS and an overall analysis by XRF as described in the examples described below.

In addition, mullite in the surface layer may form a mullite layer or may be in a state in which mullite and alumina are mixed. The interface between mullite and alumina in the surface layer may be in a state in which mullite and alumina are physically in contact with each other, and mullite and alumina may form a chemical bond such as Si—O—Al.

(Germanium)

The plate-like alumina particle according to the embodiment may include germanium. The plate-like alumina particle according to the embodiment may include the germanium in the surface layer.

While varying depending on a raw material to be used, the plate-like alumina particle according to the embodiment may include, as the germanium or germanium compound, at least one kind selected from the group consisting of, for example, compounds such as Ge, $GeO_2$, GeO, $GeC_{12}$, $GeBr_4$, $GeI_4$, $GeS_2$, AlGe, GeTe, $GeTe_3$, $As_2$, GeSe, $GeS_3As$, SiGe, $Li_2Ge$, FeGe, SrGe, and GaGe, oxides thereof, and the like and; may include the above-described substance in the surface layer.

The "germanium or germanium compound" that the plate-like alumina particle according to the embodiment includes and a "raw material germanium compound" that is used as the shape-controlling agent of the raw material may be the same kind of germanium compound. For example, from a plate-like alumina particle manufactured by the addition of $GeO_2$ to a raw material, $GeO_2$ may be detected.

When germanium or a germanium compound is included in the surface layer of the plate-like alumina particle, a significant wear reduction of an apparatus is developed. Here, the "surface layer" refers to a region 10 nm or less from the surface of the plate-like alumina particle according to the embodiment.

In the plate-like alumina particle according to the embodiment, the germanium or germanium compound is preferably unevenly distributed in the surface layer. Here, the expression "unevenly distributed in the surface layer" refers to a state in which the mass of the germanium or germanium compound per unit volume in the surface layer is greater than the mass of the germanium or germanium compound per unit volume in a region except for the surface layer. The germanium or germanium compound being unevenly distributed in the surface layer can be determined by comparing the results of a surface analysis by XPS and an overall analysis by XRF as described in the examples described below.

The plate-like alumina particles contain germanium corresponding to a raw material germanium compound used in the production method. The amount of germanium with respect to 100 mass % of the plate-like alumina particles is, in terms of germanium dioxide, preferably 10 mass % or less, more preferably 0.001 to 5 mass %, most preferably 0.01 to 4 mass %, and particularly preferably 0.1 to 3.0 mass %. When the amount of germanium is within the above range, this is preferable since the amount of germanium or a germanium compound is appropriate, the value of the (006/113) ratio is satisfied, and more preferable brilliance is obtained. The amount of germanium can be determined through XRF analysis.

XRF analysis is performed under the same conditions as the measurement conditions described in examples to be described below or under compatible conditions in which the same measurement results are obtained.

In addition, germanium or a germanium compound in the surface layer may form a layer or may be in a state in which germanium or a germanium compound and alumina are mixed. The interface between germanium or a germanium compound in the surface layer and alumina may be in a state in which germanium or a germanium compound and alumina are physically in contact with each other, and germanium or a germanium compound and alumina may form a chemical bond such as Ge—O—Al.

[Molybdenum]

The plate-like alumina particles according to the embodiment may contain molybdenum. In addition, in the plate-like alumina particles, molybdenum is preferably contained in the surface layer. Thereby, the selectivity of an inorganic material constituting an inorganic coating part is improved, and the inorganic coating part can be efficiently formed in the plate-like alumina particles.

Molybdenum may be derived from a molybdenum compound used as a flux agent in a method of producing alumina particles to be described below.

Molybdenum has a catalyst function and an optical function. In addition, when molybdenum is used, in the production method to be described below, it is possible to produce plate-like alumina particles having a plate-like shape, high crystallinity, and excellent brilliance.

There is a tendency that, when the amount of molybdenum used is increased, the particle size and the value of the (006/113) ratio are satisfied, and the brilliance of the obtained alumina particle becomes further improved. Further, the use of molybdenum accelerates the formation of mullite and enables the manufacturing of a plate-like alumina particle having a high aspect ratio and excellent dispersibility. In addition, it becomes possible to apply the plate-like alumina particle to applications as an oxidation reaction catalyst and an optical material by using the characteristics of molybdenum included in the plate-like alumina particle.

The molybdenum is not particularly limited, and not only molybdenum metal but also molybdenum oxide, a partially reduced molybdenum compound, molybdate, or the like are included.

Molybdenum may be included in any of multiple forms or a combination that a molybdenum compound is capable of having and may be included in the plate-like alumina particle as $\alpha$-$MoO_3$, $\beta$-$MoO_3$, $MoO_2$, MoO, a molybdenum cluster structure, or the like.

The form of molybdenum being contained is not particularly limited, and molybdenum may be contained in the form of being attached to the surface of the plate-like alumina particle, in the form of being substituted into part of aluminum in the crystal structure of alumina, or in a combined form thereof.

The amount of molybdenum with respect to 100 mass % of the plate-like alumina particles acquired through XRF analysis is, in terms of molybdenum trioxide, preferably 10 mass % or less, and by adjusting a firing temperature, a firing time, and a molybdenum compound sublimation rate, more preferably 0.001 to 5 mass %, most preferably 0.01 to 5 mass %, and particularly preferably 0.1 to 1.5 mass %. When the amount of molybdenum is 10 mass % or less, this is preferable since the $\alpha$ single crystal quality of alumina is improved.

When plate-like alumina particles having a larger particle size are used, the amount of molybdenum with respect to 100 mass % of the plate-like alumina particles according to the embodiment is, in terms of molybdenum trioxide, preferably 10 mass % or less, and by adjusting a firing temperature, a firing time, and a molybdenum compound sublimation rate, more preferably 0.1 to 5 mass %, and most preferably 0.3 to 1 mass %.

The amount of molybdenum can be determined through XRF analysis. XRF analysis is performed under the same conditions as the measurement conditions described in examples to be described below or under compatible conditions in which the same measurement results are obtained.

In addition, determination of the amount of Mo on the surface of the alumina particles can be performed using the above X-ray photoelectron spectroscopic (XPS) device.

[Potassium]

The plate-like alumina particles may further contain potassium.

Potassium may be derived from potassium that can be used as a flux agent in the method of producing alumina particles to be described below.

By utilizing potassium, the particle size of alumina particles can be appropriately improved in the method of producing alumina particles to be described below.

Potassium is not particularly limited, and in addition to potassium metal, potassium oxides, partially reduced potassium compounds, and the like may be used.

A form in which potassium is contained is not particularly limited, and potassium may be contained in a form in which potassium adheres to the surface of the tabular alumina with plate-like alumina particles, a form in which some aluminum of a crystal structure of alumina is replaced with potassium, or in a combination thereof.

The amount of potassium with respect to 100 mass % of the alumina particles acquired through XRF analysis is, in terms of potassium oxide ($K_2O$), preferably 0.01 mass % or more, more preferably 0.01 to 1.0 mass %, more preferably 0.03 to 0.5 mass %, and particularly preferably 0.05 to 0.3 mass %. Alumina particles in which the amount of potassium is within the above range are preferable because they have a polyhedral shape and an appropriate value of average particle size and the like.

(Other Atoms)

Other atoms refer to atoms which are intentionally added to alumina particles in order to impart mechanical strength or electric and magnetic functions without impairing effects of the present invention.

The other atoms are not particularly limited, and examples thereof include zinc, manganese, calcium, strontium, and yttrium. These other atoms may be used alone or two or more types thereof may be used in combination.

The amount of other atoms in the alumina particles with respect to the mass of the alumina particles is preferably 5 mass % or less and more preferably 2 mass % or less.

[Inevitable Impurities]

The alumina particles may contain inevitable impurities.

Inevitable impurities refer to impurities which are derived from metal compounds used in production, and although they are present in raw materials, inevitably incorporated into alumina particles in the production step, and are basically unnecessary, they are contained in a small amount but do not affect the characteristics of the alumina particles.

The inevitable impurities are not particularly limited, and examples thereof include magnesium, calcium, strontium, barium, scandium, yttrium, lanthanum, cerium, and sodium. These inevitable impurities may be contained alone or in combination of two or more types thereof.

The amount of inevitable impurities in the alumina particles with respect to the mass of the alumina particles is preferably 10,000 ppm or less, more preferably 1,000 ppm or less, and most preferably 10 to 500 ppm.

<Inorganic Coating Part>

The inorganic coating part coats at least a part of the surface of the alumina particles, and is preferably composed of an inorganic coating layer that coats at least a part of the surface of the alumina particles. In other words, at least a part of the surface of the composite particles is coated with the inorganic coating part, and preferably at least a part of the surface of the composite particles is coated with the inorganic coating layer.

As described above, the inorganic coating part is provided on the surface of the alumina particles. "On the surface of the alumina particles" refers to outside the surface of the alumina particles. Therefore, the inorganic coating part formed outside the surface of the alumina particles is clearly distinguished from the surface layer which is formed inside the surface of the alumina particles and contains mullite and germanium.

The inorganic chemical species constituting the inorganic coating part may be relatively larger than the alumina particles. However, it is preferable that the chemical species is relatively smaller than the alumina particles in that the inorganic coating part having an arbitrary coating amount (or coating thickness) can be reliably provided depending on the desired purpose. An example of the combination include alumina particles on the order of μm and inorganic chemical species of 150 nm or less. When an inorganic coating part is provided on the outside of the surface of the alumina particles using an inorganic chemical species smaller than the alumina particles, the inorganic coating part can be provided on a part of the outside of the surface of the alumina particles by using a small amount of the inorganic chemical species, such that the surface of the alumina surface may be clearly observed. Alternatively, the inorganic coating part can be provided on the surface of the alumina particles in a state where the inorganic chemical species are stacked on the surface of the alumina particles by using a large amount of the inorganic chemical species, such that the surface of the alumina particles are no observable. A shape of the inorganic chemical species constituting the inorganic coating part is not limited. For example, the shape is preferably spherical or polyhedral in that it is possible to form the closest-packing structure and reliably mask the surface of the alumina particles with the minimum amount of the inorganic chemical species to be used.

The composite particle of the present invention is composed of alumina particles containing molybdenum and an inorganic coating part made of an inorganic chemical species, and has excellent properties that cannot be expressed by a simple mixture of alumina particles and inorganic chemical species. In the composite particles of the present invention, in the case of a combination of alumina particles containing molybdenum of µm order and non-aggregated inorganic chemical species of 150 nm or less, for example, due to intermolecular force or in some cases local chemical reaction, interaction between the alumina particles and the inorganic chemical species increases. As a result, particularly excellent properties can be reliably expressed, such as higher coating characteristics, a more uniform inorganic coating part, and the obtained inorganic coating part being difficult to be peeled off from the alumina particles. The contribution of molybdenum contained in the alumina particles can also be expected. Independent inorganic species of nm order can be obtained by, for example, mechanically crushing inorganic species of µm order. However, since re-aggregation thereof occurs immediately, the chemical species are not easy to handle. When alumina particles containing no molybdenum or agglomerated inorganic species are used, only a simple mixture of the alumina particles and the inorganic chemical species is formed. Such simple mixture of the alumina particles and the inorganic chemical species do not exhibit the properties of the composite particles of the present invention. According to the composite particle manufacturing method of the present invention described later, composite particles with higher coating efficiency can be manufactured more reliably.

The inorganic coating part can be made of, for example, an oxide or a metal. Examples of oxides include one or more selected from the group consisting of titanium oxide ($TiO_2$), iron oxide ($Fe_2O_3$) and silica ($SiO_2$). Examples of metals include one or more selected from the group consisting of silver (Ag), nickel (Ni), copper (Cu), gold (Au) and platinum (Pt).

The form of the oxide or metal constituting the inorganic coating part is not particularly limited, and examples thereof include particle forms such as a spherical shape, a needle shape, a polyhedral shape, a disk shape, a hollow shape, and a porous form. The average particle size of particles made of an oxide or metal having a particle form is, for example, preferably 1 nm or more and 500 nm or less, and more preferably 5 nm or more and 200 nm or less. The particles made of an oxide or a metal may be crystalline or amorphous.

When the inorganic coating part is an inorganic coating layer, the thickness of one inorganic coating layer formed on the surface of the alumina particles is preferably 20 nm or more and 400 nm or less, preferably 30 nm or more and 300 nm or less, and particularly preferably 30 nm or more and 200 nm or less.

When the inorganic coating layer is made of titanium oxide, a desired interference color can be obtained by changing the thickness of the inorganic coating layer. When the thickness of the inorganic coating layer increases, the color intensity increases.

When the inorganic coating layer is made of iron oxide, the color of the composite particles is red or reddish brown.

The inorganic coating part may be composed of one layer or may be composed of a plurality of layers. In addition, when the inorganic coating part is composed of a plurality of layers, the plurality of layers may be composed of different materials.

[XRF Coating Rate of Composite Particles]

The XRF coating rate (%) of the composite particles according to the embodiment can be obtained using, for example, an X-ray fluorescence (XRF) analyzing device to be described below.

The XRF coating rate (%) is obtained based on, for example, the amount of metal oxide constituting the inorganic coating part with respect to the amount of aluminum oxide constituting the alumina particles, and can be obtained, for example, from $[MO_x]/[Al_2O_3]$(mass ratio) obtained from the XRF analysis results.

[Coating Efficiency of Composite Particles]

The coating efficiency of the composite particles according to the embodiment can be obtained from the ratio of the XRF coating rate with respect to a theoretical coating rate to be described below. The coating efficiency is preferably 30% or more, more preferably 80% or more, and most preferably 90% or more.

[Organic Compound Layer on Composite Particles Surface]

In one embodiment, an organic compound layer may be provided on the surface of the composite particles. An organic compound constituting the organic compound layer is present on the surface of the composite particles and has a function of adjusting surface physical properties of the composite particles. For example, composite particles containing an organic compound on the surface may improve affinity with a resin so that a function of the alumina particles as a filler can be exhibited to a maximum level.

The organic compound is not particularly limited, and examples thereof include organosilanes, alkylphosphonic acids, and polymers.

Examples of organosilanes include alkyltrimethoxysilanes with alkyl groups having 1 to 22 carbon atoms such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, and alkyltrichlorosilanes, 3,3,3-trifluoropropyltrimethoxysilane, tridecafluoro-1,1,2,2-tetrahydrooctyl)trichlorosilanes, phenyltrimethoxysilane, phenyltriethoxysilane, p-chloromethylphenyltrimethoxysilane, and p-chloromethylphenyltriethoxysilane.

Examples of phosphonic acids include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzenephosphonic acid.

Regarding the polymer, for example, poly(meth)acrylates can be appropriately used. Specific examples thereof include polymethyl(meth)acrylates, polyethyl(meth)acrylates, polybutyl(meth)acrylates, polybenzyl(meth)acrylates, polycyclohexyl(meth)acrylates, poly t-butyl(meth)acrylates, polyglycidyl(meth)acrylates, and polypentafluoropropyl (meth)acrylates, and also include polymers such as general-purpose polystyrenes, polyvinyl chlorides, polyvinyl acetates, epoxy resins, polyesters, polyimides, and polycarbonates.

Here, one or two or more of the above organic compounds may be contained.

A form in which an organic compound is contained is not particularly limited, and an organic compound may be covalently linked to alumina or may coat alumina or the material of the inorganic coating part.

The amount of the organic compound with respect to the mass of the alumina particles is preferably 20 mass % or less and more preferably 10 mass % or more and 0.01 mass % or less. When the amount of the organic compound is 20 mass % or less, this is preferable since physical properties derived from the composite particles can be easily exhibited.

<Method of Producing Composite Particles>

Next, a method of producing composite particles according to a first embodiment will be exemplified in detail. The method of producing composite particles according to the present embodiment is not limited to the following method of producing composite particles.

The method of producing composite particles according to the present embodiment includes producing alumina particles by firing a mixture including an aluminum compound containing aluminum element, a molybdenum compound containing molybdenum element, and a shape-controlling agent for controlling the shape of alumina particles; and forming an inorganic coating part on the surface of the alumina particles.

<Method of Producing Plate-Like Alumina Particles>

The method of producing plate-like alumina particles constituting composite particles is not particularly limited, and known techniques are appropriately applied. However, a production method according to a flux method using a molybdenum compound is preferably applied because it is then possible to appropriately control alumina particles having a high α-crystallization rate at a relatively low temperature.

In more detail, a preferable method for manufacturing the plate-like alumina particle includes a step (firing step) of firing an aluminum compound in the presence of a molybdenum compound and a shaping controlling agent. The firing step may be a step of firing a mixture obtained in a step (mixing step) of obtaining a mixture that is a firing subject.

[Mixing Step]

The mixing step is a step of mixing an aluminum compound, a molybdenum compound, and a shape-controlling agent to produce the mixture. Hereinafter, the content of the mixture will be described below.

(Aluminum Compound)

The aluminum compound in the present embodiment is a compound including an aluminum element and a raw material of the plate-like alumina particle according to the embodiment. The aluminum compound is not particularly limited as long as the aluminum compound is turned into an alumna particle by a heat treatment, and it is possible to use, for example, aluminum chloride, aluminum sulfate, basic aluminum acetate, aluminum hydroxide, boehmite, pseudo-boehmite, transition alumina (γ-alumina, δ-alumina, θ-alumina, or the like), α-alumina, mixed alumina particles having two or more kinds of crystal phases, or the like, and the physical forms such as shape, particle diameter, and specific surface area of the aluminum compound as a precursor are not particularly limited.

According to the flux method described in detail below, it is possible to preferably use the aluminum compound regardless of the shape of the aluminum compound in the embodiment such as any one of a spherical structure, an irregular shape, a structure having an high aspect ratio (for example, a wire, a fiber, a ribbon, a tube, or the like), a sheet, and the like.

Similarly, according to the flux method described in detail below, regarding the particle diameter of the aluminum compound, it is possible to preferably use a solid of the aluminum compound having a particle diameter of several nanometers to several hundreds of micrometers.

The specific surface area of the aluminum compound is not particularly limited. The specific surface area is preferably large in order for the molybdenum compound to act effectively, but the aluminum compound can be used as a raw material regardless of the specific surface area by adjusting a firing condition or the amount of the molybdenum compound used.

In addition, the aluminum compound may be the aluminum compound alone or a composite body of the aluminum compound and the organic compound. For example, an organic/inorganic composite body obtained by modifying the aluminum compound by using an organosilane, an aluminum compound composite body to which a polymer is adsorbed, and the like can also be preferably used. In the case of using these composite bodies, the content rate of the organic compound is not particularly limited, and the content rate is preferably 60% by mass or less and more preferably 30% by mass or less since it is possible to efficiently manufacture the plate-like alumina particle.

(Shape-Controlling Agent)

A shape-controlling agent can be used in order to form the plate-like alumina particle according to the embodiment. The shape-controlling agent plays an important role in the plate-like crystal growth of alumina by firing the alumina compound in the presence of the molybdenum compound.

The presence state of the shape-controlling agent is not particularly limited, and it is possible to preferably use a physical mixture of the shape-controlling agent and the aluminum compound, a composite body including the shape-controlling agent uniformly or locally present on the surface or inside of the aluminum compound, and the like.

In addition, the shape-controlling agent may be added to the aluminum compound and may be included in the aluminum compound as an impurity.

The shape-controlling agent plays an important role in plate-like crystal growth. In a molybdenum oxide flux method that is performed ordinarily, molybdenum oxide reacts with the aluminum compound, thereby forming aluminum molybdate, and then, in a decomposition process of this aluminum molybdate, a change in chemical potential serves as a driving force for crystallization, and thus a hexagonal bipyramid-type polyhedral particle in which a euhedral face (113) has developed is formed. It is considered that, in the manufacturing method of the embodiment, the shape-controlling agent is localized near the surface of the particle in an α-alumina growth process, thereby significantly inhibiting the growth of the euhedral face (113), and, consequently, the growth of a crystal orientation in a face direction becomes relatively fast, a (001) face or the (006) face grows, and a plate-like form can be formed. A plate-like alumina particle having a high α-crystallization rate and including molybdenum can be more easily formed by using the molybdenum compound as the flux agent.

Here, the above mechanism is only a speculation, and even if effects of the present invention are obtained through a mechanism different from the above mechanism, the mechanism is included in the technical scope of the present invention.

Regarding the type of the shape-controlling agent, at least one selected from the group consisting of silicon, a silicon compound, and a germanium compound is preferably used because it allows plate-like alumina particles having a higher aspect ratio, superior dispersibility, and superior productivity to produce. Silicon or a silicon compound and a germanium compound can be used in combination. Regarding the shape-controlling agent, silicon or a silicon compound containing silicon element is preferably used because it serves as a Si supply source of mullite and produces mullite efficiently. In addition, regarding the shape-controlling agent, a germanium compound is preferably used because it allows plate-like alumina particles having a higher aspect ratio and a larger particle size to produce compared to when silicon or a silicon compound is used.

According to the above flux method using silicon or a silicon compound as the shape-controlling agent, it is possible to easily produce plate-like alumina particles containing mullite in the surface layer.

According to the above flux method using a raw material germanium compound as the shape-controlling agent, it is possible to easily produce plate-like alumina particles containing germanium or a germanium compound.

Silicon or Silicon Compound

The silicon or silicon compound including a silicon element is not particularly limited, and a well-known one can be used. As specific examples of the silicon or silicon compound including a silicon element, artificial synthetic silicon compounds such as silicon metal, an organosilane, a silicon resin, a silicon fine particle, a silica gel, mesoporous silica, SiC, and mullite; and natural silicon compounds such as biosilica; and the like are exemplified. Among these, an organosilane, a silicon resin, and a silicon fine particle are preferably used since it is possible to more uniformly form the composition and mix with the aluminum compound. The silicon or silicon compound including a silicon element may be used singly or two or more kinds may be used in combination. In addition, the shape-controlling agent may be jointly used with another shape-controlling agent as long as the effect in the present invention is not impaired.

The shape of the silicon or silicon compound including a silicon element is not particularly limited, and it is possible to preferably use, for example, a spherical structure, an irregular shape, a structure having an high aspect ratio (for example, a wire, a fiber, a ribbon, a tube, or the like), a sheet, and the like.

Germanium Compound

The raw material germanium compound that is used as the shape-controlling agent is not particularly limited, and a well-known germanium compound can be used. As specific examples of the raw material germanium compound, germanium metal, germanium dioxide, germanium monoxide, germanium tetrachloride, an organic germanium compound having a Ge—C bond, and the like are exemplified. The raw material germanium compound may be used singly or two or more kinds may be used in combination. In addition, the shape-controlling agent may be jointly used with another shape-controlling agent as long as the effect in the present invention is not impaired.

The shape of the raw material germanium compound is not particularly limited, and it is possible to preferably use, for example, a spherical structure, an irregular shape, a structure having an high aspect ratio (for example, a wire, a fiber, a ribbon, a tube, or the like), a sheet, and the like.

(Molybdenum Compound)

As will be described below, the molybdenum compound functions as a fluxing agent in a crystal growth of alumina.

The molybdenum compound is not particularly limited, and examples thereof include molybdenum oxide and a compound containing acid radical anions ($MoO_x^{n-}$) formed by a bond of a molybdenum metal and oxygen.

The compound containing acid radical anions ($MoO_x^{n-}$) is not particularly limited, and examples thereof include molybdate, sodium molybdate, potassium molybdate, lithium molybdate, $H_3PMo_{12}O_{40}$, $H_3SiMo_{12}O_{40}$, $NH_4Mo_7O_{12}$, and molybdenum disulfide.

The molybdenum compound can contain silicon. In this case, the molybdenum compound containing silicon serves as both a flux agent and a shape-controlling agent.

Among the above molybdenum compounds, molybdenum oxide is preferably used in consideration of ease of sublimation and costs. In addition, the above molybdenum compounds may be used alone or two or more types thereof may be used in combination.

In addition, since potassium molybdate ($K_2Mo_nO_{3n+1}$, $n=1$ to 3) contains potassium, it also has a function as a potassium compound to be described below. In the production method according to the embodiment, using potassium molybdate as a flux agent is synonymous with using a molybdenum compound and a potassium compound as a flux agent.

(Potassium Compound)

A potassium compound may be additionally used together with the shape-controlling agent.

The potassium compound is not particularly limited, and potassium chloride, potassium chlorite, potassium chlorate, potassium sulfate, potassium hydrogen sulfate, potassium sulfite, potassium hydrogen sulfite, potassium nitrate, potassium carbonate, potassium hydrogen carbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, potassium tungstate, and the like are exemplified. At this time, the potassium compounds include an isomer in the same manner as the molybdenum compound. Among these, potassium carbonate, potassium hydrogen carbonate, potassium oxide, potassium hydroxide, potassium chloride, potassium sulfate, and potassium molybdate are preferably used, and potassium carbonate, potassium hydrogen carbonate, potassium chloride, potassium sulfate, and potassium molybdate are more preferably used.

The potassium compound may be used singly or two or more kinds may be used in combination.

The potassium compound contributes to efficient formation of mullite in the surface layer of alumina. In addition, the potassium compound contributes to efficient formation of a layer containing germanium in the surface layer of alumina.

In addition, the potassium compound is preferably used as a flux agent together with the molybdenum compound.

Among the above compounds, since potassium molybdate contains molybdenum, it has a function as the above molybdenum compound. When potassium molybdate is used as a flux agent, the same effects as when a molybdenum compound and a potassium compound are used as a flux agent can be obtained.

As a potassium compound that is used when a raw material is prepared or produced in a reaction in a temperature raising process during firing, a water-soluble potassium compound, for example, potassium molybdate, can be easily collected by washing after firing without being vaporized even in a firing temperature range. Therefore, an amount of the molybdenum compound released to the outside of the firing furnace is also reduced, and production costs can be significantly reduced.

When the molybdenum compound and the potassium compound are used as a flux agent, the molar ratio of molybdenum element of the molybdenum compound to potassium element of the potassium compound (molybdenum element/potassium element) is preferably 5 or less, more preferably 0.01 to 3, and most preferably 0.5 to 1.5 because production costs can be further reduced. When the molar ratio (molybdenum element/potassium element) is within the above range, this is preferable since plate-like alumina particles having a large particle size can be obtained.

(Metal Compound)

As will be described below, the metal compound has a function of promoting crystal growth of alumina. The metal compound can be used during firing as desired. Here, since the metal compound is used for promoting crystal growth of α-alumina, the metal compound is not an essential constitution for producing the plate-like alumina particles according to the present invention.

The metal compound is not particularly limited, and preferably includes at least one selected from the group consisting of Group II metal compounds and Group III metal compounds.

Examples of Group II metal compounds include magnesium compounds, calcium compounds, strontium compounds, and barium compounds.

Examples of Group III metal compounds include scandium compounds, yttrium compounds, lanthanum compounds, and cerium compounds.

Here, the above metal compounds refer to oxides, hydroxides, carbonates, and chlorides of metal elements. For example, in the case of an yttrium compound, yttrium oxide ($Y_2O_3$), yttrium hydroxide, and carbonated yttrium may be exemplified. Among these, the metal compound is preferably an oxide of a metal element. Here, such a metal compound includes an isomer.

Among these, metal compounds of period 3 elements, metal compounds of period 4 elements, metal compounds of period 5 elements, or metal compounds of period 6 elements are preferable, metal compounds of period 4 elements or metal compounds of period 5 elements are more preferable, and metal compounds of period 5 elements are most preferable. Specifically, a magnesium compound, a calcium compound, an yttrium compound, or a lanthanum compound is preferably used, a magnesium compound, a calcium compound, or an yttrium compound is more preferably used, and an yttrium compound is particularly preferably used.

An amount of the metal compound added with respect to the value in terms of mass of aluminum atoms in the aluminum compound is preferably 0.02 to 20 mass % and more preferably 0.1 to 20 mass %. When an amount of the metal compound added is 0.02 mass % or more, this is preferable since crystal growth of α-alumina containing molybdenum can proceed appropriately. On the other hand, when an amount of the metal compound added is 20 mass % or less, this is preferable since it is possible to obtain plate-like alumina particles having a small amount of impurities derived from the metal compound.

[Yttrium]

When the aluminum compound is fired in the presence of an yttrium compound as a metal compound, in this firing step, crystal growth proceeds more appropriately, and α-alumina and a water-soluble yttrium compound are produced. In this case, since the water-soluble yttrium compound is likely to be localized on the surface of α-alumina as plate-like alumina particles, as necessary, washing with water, alkaline water, a liquid in which these are warmed, or the like is performed, and thus the yttrium compound can be removed from the plate-like alumina particles.

Amounts of the above aluminum compound, molybdenum compound, silicon or a silicon compound, germanium compound, potassium compound, and the like used are not particularly limited. For example, when a total amount of raw materials in terms of oxide is set as 100 mass %, the following mixture may be fired.

1) A Mixture in which
  in terms of $Al_2O_3$, preferably 50 mass % or more of an aluminum compound, more preferably 70 mass % or more and 99 mass % or less of an aluminum compound, and most preferably 80 mass % or more and 94.5 mass % or less of an aluminum compound,
  in terms of $MoO_3$, preferably 40 mass % or less of a molybdenum compound, more preferably 0.5 mass % or more and 20 mass % or less of a molybdenum compound, and most preferably 1 mass % or more and 7 mass % or less of a molybdenum compound, and
  in terms of $SiO_2$ or in terms of $GeO_2$, preferably 0.1 mass % or more and 10 mass % or less of silicon, a silicon compound or a germanium compound, more preferably 0.5 mass % or more and less than 7 mass % of silicon, a silicon compound or a germanium compound, and most preferably 0.8 mass % or more and 4 mass % or less of silicon, a silicon compound or a germanium compound
  are mixed.

In order to obtain plate-like alumina particles having a larger particle size, in the above mixture, in terms of $MoO_3$, preferably 7 mass % or more and 40 mass % or less of a molybdenum compound is used, more preferably 9 mass % or more and 30 mass % or less of a molybdenum compound is used, and most preferably 10 mass % or more and 17 mass % or less of a molybdenum compound is used.

In order to obtain plate-like alumina particles having a larger particle size, in the above mixture, in terms of $SiO_2$ and/or in terms of $GeO_2$, preferably 0.4 mass % or more and less than 10 mass %, more preferably 0.5 mass % or more and 10 mass % or less, and particularly preferably 1 mass % or more and 3 mass % or less of silicon, a silicon compound and/or a germanium compound is used.

The silicon, silicon compound and/or germanium compound in the shape-controlling agent may be silicon or a silicon compound or may be a germanium compound.

Regarding the shape-controlling agent, silicon or a silicon compound may be used alone; a germanium compound may be used alone; or a combination of silicon or a silicon compound, and a germanium compound may be used.

If the germanium compound is used as a shape-controlling agent, when a total amount of raw materials in terms of oxide is set as 100 mass %, in terms of $GeO_2$, preferably 0.4 mass % or more and less than 1.5 mass %, and more preferably 0.7 mass % or more and 1.2 mass % or less of a germanium compound may be added to the mixture.

The conditions in which the above raw materials are added (mass %) may be freely combined for each raw material, and the lower limit value and the upper limit value in each raw material added (mass %) can also be freely combined.

When various compounds within the above range are used, plate-like alumina particles satisfying the value of the (006/113) ratio and having excellent brilliance can be easily produced.

When the mixture further contains the above potassium compound, an amount of the potassium compound used is not particularly limited. Here, when the total amount of raw materials in terms of oxide is set as 100 mass %, in terms of $K_2O$, preferably 5 mass % or less, more preferably 0.01 mass % or more and 3 mass % or less, and most preferably 0.05 mass % or more and 1 mass % or less of the potassium compound can be added.

It is thought that, when the potassium compound is used, potassium molybdate formed according to a reaction with the molybdenum compound contributes to promotion of mullite formation on the surface of the plate-like alumina particles by exhibiting a Si diffusion effect.

Similarly, it is thought that, when the potassium compound is used, potassium molybdate formed according to a reaction with the molybdenum compound contributes to promotion of formation of germanium or a germanium compound on the surface of the plate-like alumina particles by exhibiting a raw material germanium diffusion effect.

As a potassium compound that is used when a raw material is prepared or produced in a reaction in a temperature raising process during firing, a water-soluble potassium compound, for example, potassium molybdate, can be easily collected by washing after firing without being vaporized even in a firing temperature range. Therefore, an amount of the molybdenum compound released to the outside of the firing furnace is also reduced, and production costs can be significantly reduced.

In the flux method, a molybdenum compound and a potassium compound are preferably used as a flux agent.

Here, a compound containing molybdenum and potassium as a flux agent can be produced, for example, in a firing process using a molybdenum compound and a potassium compound as raw materials which are cheaper and easily available. Here, an example in which, in both a case in which the molybdenum compound and the potassium compound are used as a flux agent and a case in which a compound containing molybdenum and potassium is used as a flux agent, the molybdenum compound and the potassium compound are used as a flux agent will be described.

In order to obtain plate-like alumina particles having a larger particle size, amounts of the above aluminum compound, molybdenum compound, potassium compound, and silicon or silicon compound used can be preferably as follows when a total amount of raw materials in terms of oxide is set as 100 mass %.

2) A mixture in which 10 mass % or more of an aluminum compound in terms of $Al_2O_3$, 20 mass % or more of a molybdenum compound in terms of $MoO_3$, 1 mass % or more of a potassium compound in terms of $K_2O$, and less than 1 mass % of silicon or a silicon compound in terms of $SiO_2$ are mixed.

When a total amount of raw materials in terms of oxide is set as 100 mass %, more preferably, the following mixture can be used because the amount of hexagonal plate-like alumina can be further increased.

3) A mixture in which 20 mass % or more and 70 mass % or less of an aluminum compound in terms of $Al_2O_3$, 30 mass % or more and 80 mass % or less of a molybdenum compound in terms of $MoO_3$, 5 mass % or more and 30 mass % or less of a potassium compound in terms of $K_2O$, and 0.001 mass % or more and 0.3 mass % or less of silicon or a silicon compound in terms of $SiO_2$ are mixed.

When a total amount of raw materials in terms of oxide is set as 100 mass %, most preferably, the following mixture can be used because the amount of hexagonal plate-like alumina can be further increased.

4) A mixture in which 25 mass % or more and 40 mass % or less of an aluminum compound in terms of $Al_2O_3$, 45 mass % or more and 70 mass % or less of a molybdenum compound in terms of $MoO_3$, 10 mass % or more and 20 mass % or less of a potassium compound in terms of $K_2O$, and 0.01 mass % or more and 0.1 mass % or less of silicon or a silicon compound in terms of $SiO_2$ are mixed.

In order for crystal growth to proceed more appropriately and to maximize the amount of hexagonal plate-like alumina, particularly preferably the following mixture can be used.

5) A mixture in which, when a total amount of raw materials in terms of oxide is set as 100 mass %, 35 mass % or more and 40 mass % or less of an aluminum compound in terms of $Al_2O_3$, 45 mass % or more and 65 mass % or less of a molybdenum compound in terms of $MoO_3$, 10 mass % or more and 20 mass % or less of a potassium compound in terms of $K_2O$, and 0.02 mass % or more and 0.08 mass % or less of a silicon or a silicon compound in terms of $SiO_2$ are mixed.

When various compounds within the above ranges are added, it is possible to produce plate-like alumina particles having a plate-like shape and a large particle size, and superior brilliance. In particular, hexagonal plate-like alumina particles having a larger particle size and a larger crystallite size can be easily obtained by increasing an amount of molybdenum used and reducing an amount of silicon used to some extent. When various compounds within the above more preferable ranges are added, hexagonal plate-like alumina particles can be easily obtained, the content thereof can be further increased, and the obtained alumina particles tend to have superior brilliance.

When the mixture further contains the above yttrium compound, an amount of the yttrium compound used is not particularly limited. Here, when a total amount of raw materials in terms of oxide is set as 100 mass %, in terms of $Y_2O_3$, preferably 5 mass % or less, and more preferably 0.01 mass % or more and 3 mass % or less of the yttrium compound can be added. In order for crystal growth to proceed more appropriately, when a total amount of raw materials in terms of oxide is set as 100 mass %, in terms of $Y_2O_3$, more preferably, 0.1 mass % or more and 1 mass % or less of the yttrium compound can be added.

The numerical ranges of amounts of the above raw materials used can be appropriately combined as long as the total content thereof does not exceed 100 mass %.

[Firing Step]

The firing step is a step of firing an aluminum compound in the presence of a molybdenum compound and a shape-controlling agent. The firing step may be a step of firing the mixture obtained in the mixing step.

Plate-like alumina particles can be obtained by, for example, firing an aluminum compound in the presence of a molybdenum compound and a shape-controlling agent. As described above, this production method is called a flux method.

The flux method is classified into a solution method. In more detail, the flux method is a crystal growth method in which the fact that a crystal-flux binary phase diagram is a eutectic-type phase diagram is used. The mechanism of the flux method is conjectured to be as described below. That is, when a mixture of a solute and a flux is heated, the solute and the flux become a liquid phase. At this time, the flux is a fusing agent, in other words, the solute-flux binary phase diagram is a eutectic-type phase diagram, and thus the solute is fused at a temperature lower than the melting temperature of the solute and configures the liquid phase. When the flux is vaporized in this state, the concentration of the flux decreases, in other words, the effect of the flux for lowering the melting temperature of the solute becomes weak, and the vaporization of the flux serves as a driving force, whereby the crystal growth of the solute is caused (flux vaporization method). The solute and the flux are also capable of causing the crystal growth of the solute by cooling the liquid phase (slow cooling method).

The flux method has advantages of causing crystal growth at a temperature far lower than the melting temperature, precisely controlling the crystal structure, and forming a polyhedral crystal having an euhedral face.

Regarding the manufacturing of an α-alumina particle by the flux method in which the molybdenum compound is used as the flux, the mechanism is not clear, but is conjectured, for example, as described below. That is, when the aluminum compound is fired in the presence of the molybdenum compound, aluminum molybdate is first formed. At this time, as is clear from the above description, the aluminum molybdate grows an α-alumina crystal at a temperature lower than the melting temperature of alumina. In addition, the crystal growth is accelerated through, for example, the decomposition of the aluminum molybdate, the vaporization of the flux, and the like, whereby an alumina particle can be obtained. That is, the molybdenum compound functions as the flux, and the α-alumina particle is produced via an intermediate of aluminum molybdate.

Regarding the manufacturing of the α-alumina particle by the flux method in which the potassium compound is further used as the flux, the mechanism is not clear, but it is conjectured, for example, as described below. First, the molybdenum compound and the aluminum compound react with each other, thereby forming aluminum molybdate. In addition, for example, the aluminum molybdate is decomposed to become molybdenum oxide and alumina, and, at the same time, the molybdenum compound including molybdenum oxide obtained by decomposition reacts with the potassium compound, thereby forming potassium molybdate. An alumina crystal grows in the presence of the molybdenum compound including the potassium molybdate, whereby the plate-like alumina particle according to the embodiment can be obtained.

A plate-like alumina particle which satisfies the value of the (006/113) ratio and has excellent brilliance can be manufactured by the flux method.

A method for the firing is not particularly limited, and the firing can be performed by a well-known conventional method. When the firing temperature exceeds 700° C., the aluminum compound and the molybdenum compound react with each other, thereby forming aluminum molybdate. Further, when the firing temperature reaches 900° C. or higher, the aluminum molybdate is decomposed, and the plate-like alumina particle is formed by the action of the shape-controlling agent. In addition, it is considered that, in the plate-like alumina particle, when the aluminum molybdate is decomposed to become alumina and molybdenum oxide, the molybdenum compound is incorporated into an aluminum oxide particle.

In addition, it is considered that, when the firing temperature reaches 900° C. or higher, the molybdenum compound obtained by the decomposition of the aluminum molybdate (for example, molybdenum trioxide) reacts with the potassium compound, thereby forming potassium molybdate.

Further, it is considered that, when the firing temperature reaches 1000° C. or higher, $Al_2O_3$ and $SiO_2$ on the surface of the plate-like alumina particle react with each other together with the crystal growth of the plate-like alumina particle in the presence of molybdenum, thereby forming mullite at a high efficiency.

Similarly, it is considered that, when the firing temperature reaches 1000° C. or higher, $Al_2O_3$ and the Ge compound on the surface of the plate-like alumina particle react with each other together with the crystal growth of the plate-like alumina particle in the presence of molybdenum, thereby forming a compound having germanium dioxide or Ge—O—Al or the like at a high efficiency.

In addition, during the firing, the states of the aluminum compound, the shape-controlling agent, and the molybdenum compound are not particularly limited, and the molybdenum compound and the shape-controlling agent need to be present in the same space so that the molybdenum compound and the shape-controlling agent are capable of acting on the aluminum compound. Specifically, the molybdenum compound, the shape-controlling agent, and the aluminum compound may be mixed together by simple mixing of mixing the powders of the molybdenum compound, the shape-controlling agent, and the aluminum compound, mechanical mixing by a grinder, a mixer or the like, or mixing by a mortar or the like, and the molybdenum compound, the shape-controlling agent, and the aluminum compound may be mixed together in a dry state or a wet state.

The condition of the firing temperature is not particularly limited and is appropriately determined by the value of the (006/113) ratio, the average particle diameter, and the aspect ratio of a target plate-like alumina particle, the formation of mullite, the value of the longitudinal relaxation time $T_1$, dispersibility, and the like. Generally, regarding the temperature of firing, the peak temperature is preferably equal to or higher than 900° C. that is the decomposition temperature of aluminum molybdate ($Al_2(MoO_4)_3$), more preferably equal to or higher than 1000° C. at which mullite or the germanium compound is highly efficiently formed, and more preferably equal to or higher than 1,200° C. at which a plate-like alumina particle having a longitudinal relaxation time $T_1$ of five seconds or longer (highly crystalline) can be easily obtained.

Generally, when it is intended to control the shape of α-alumina obtained after firing, it is necessary to perform firing at a high temperature of 2000° C. or higher that is close to the melting temperature of α-alumina, which creates a significant problem in industrial use from the viewpoint of the load on a firing furnace or fuel costs.

The manufacturing method of the embodiment can also be performed even at a high temperature of higher than 2000° C.; however, even at a temperature far lower than the melting temperature of α-alumina which is 1600° C. or lower, it is possible to form α-alumina particles having a plate-like shape having a high α crystallization rate and a high aspect ratio regardless of the shape of a precursor.

According to one embodiment of the present invention, even if the maximum firing temperature condition is 900 to 1,600° C., it is possible to efficiently form plate-like alumina particles having a high aspect ratio and an α-crystallization rate of 90% or more at low cost. Firing at a maximum temperature of 950 to 1,500° C. is more preferable, firing at a maximum temperature in a range of 1,000 to 1,400° C. is still more preferable, and firing at a maximum temperature of 1,200 to 1,400° C. is most preferable.

Regarding the firing time, firing is performed for a temperature raising time in a range of 15 minutes to 10 hours to reach a predetermined maximum temperature, and preferably a holding time at the firing maximum temperature is in a range of 5 minutes to 30 hours. In order to efficiently form plate-like alumina particles, a firing holding time of about 10 minutes to 15 hours is more preferable.

When conditions of a maximum temperature of 1,000 to 1,400° C. and a firing holding time of 10 minutes to 15 hours are selected, dense polygonal plate-like alumina particles in the α crystal form are unlikely to adhere to each other and can be easily obtained.

When conditions of a maximum temperature of 1,200 to 1,400° C. and a firing holding time of 10 minutes to 15 hours are selected, plate-like alumina particles having a longitudinal relaxation time $T_1$ of 5 seconds or longer (high crystallinity) can be easily obtained.

The firing atmosphere is not particularly limited as long as effects of the present invention are obtained. For example, an oxygen-containing atmosphere such as air or oxygen, or an inert atmosphere such as nitrogen, argon, or carbon dioxide is preferable, and an air atmosphere is more preferable in consideration of costs.

An apparatus for firing is not always limited, and a so-called firing furnace can be used. The firing furnace is preferably configured of a material that does not react with sublimated molybdenum oxide, and a highly airtight firing furnace is preferably used so as to more efficiently use molybdenum oxide.

The alumina particles are preferably obtained by firing an aluminum compound in the presence of a molybdenum compound and a shape-controlling agent or in the presence of a molybdenum compound, a shape-controlling agent, a potassium compound and metal oxide.

That is, a preferable method of producing alumina particles includes a step of firing an aluminum compound in the presence of a molybdenum compound and a shape-controlling agent or in the presence of a molybdenum compound, a shape-controlling agent and a potassium compound (firing step). Preferably, the mixture further contains the above metal compound. Regarding the metal compound, an yttrium compound is preferable.

In the flux method using a molybdenum compound, molybdenum oxide reacts with an aluminum compound to form aluminum molybdate, and next, change in chemical potential during decomposition of aluminum molybdate serves as a driving force for crystallization, and thus hexagonal bipyramidal polyhedral particles with developed euhedral face (113) are formed. Thus, it is thought that, when the shape-controlling agent is localized in the vicinity of the surface of particles in the α-alumina growth process, the growth of the euhedral face (113) is significantly inhibited, and as a result, growth of the crystal orientation in the planar direction is relatively fast, the (001) plane or the (006) plane grows, and plate-like forms can be formed. Therefore, when the molybdenum compound is used as a flux agent, it is possible to form plate-like alumina particles having a high α-crystallization rate and containing molybdenum more easily.

[Cooling Step]

When a molybdenum compound and a potassium compound are used as a flux agent, the method of producing alumina particles may include a cooling step. The cooling step is a step of cooling alumina of which a crystal is grown in the firing step. More specifically, it may be a step of cooling a composition including the alumina obtained in the firing step and a flux agent in a liquid phase.

The cooling rate is not particularly limited, and 1 to 1,000° C./hour is preferable, 5 to 500° C./hour is more preferable, and 50 to 100° C./hour is most preferable. When the cooling rate is 1° C./hour or more, this is preferable since the production time can be shortened. On the other hand, when the cooling rate is 1,000° C./hour or less, this is preferable since the firing container is less likely to break due to heat shock and can be used for a long time.

The cooling method is not particularly limited, and natural cooling or a cooling device may be used.

[Post-Treatment Step]

The method of producing plate-like alumina particles according to the embodiment may include a post-treatment step. The post-treatment step is a post-treatment step for plate-like alumina particles and is a step of removing the flux agent. The post-treatment step may be performed after the above firing step, may be performed after the above cooling step, or may be performed after the firing step and the cooling step. In addition, as necessary, this step may be repeated twice or more.

Examples of post-treatment methods include washing and a high temperature treatment. These can be performed in combination.

The washing method is not particularly limited, and the flux agent can be removed by washing with water, an ammonia aqueous solution, a sodium hydroxide aqueous solution, or an acidic aqueous solution.

In this case, it is possible to control the amount of molybdenum by appropriately changing the concentration and amount of water, an ammonia aqueous solution, a sodium hydroxide aqueous solution, or an acidic aqueous solution used; a washing part; a washing time; and the like.

In addition, examples of high temperature treatment methods include a method of raising the temperature to a sublimation point or boiling point or higher of the flux.

[Pulverizing Step]

In the fired product, plate-like alumina particles adhere to each other and may not have an appropriate particle size range of the present invention. Therefore, the plate-like alumina particles may be pulverized as necessary so that they have an appropriate particle size range of the present invention.

A fired product pulverizing method is not particularly limited, and pulverization methods known in the related art using a ball mill, a jaw crusher, a jet mill, a disc mill, a spectromill, a grinder, a mixer mill, and the like can be applied.

[Classification Step]

The plate-like alumina particle is preferably subject to a classification treatment in order to adjust the average particle diameter and improve the fluidity of powder or to suppress an increase in viscosity when formulated into a binder for forming a matrix. The "classification treatment" refers to an operation to divide particles into groups based on the size of the particle.

The classification may be any of a wet type and a dry type, and dry-type classification is preferable from the viewpoint of productivity. Examples of the dry-type classification include not only classification by a sieve but also wind power classification in which classification is performed by a difference between the centrifugal force and the fluid drag, and from the viewpoint of classification precision, wind power classification is preferable, and it is possible to perform wind power classification using a classifier such as an air classifier in which the Coanda effect is used, a swirling airflow-type classifier, a forced vortex centrifugal classifier, or a semi-free vortex centrifugal classifier.

The grinding step or the classification step can be performed at any stage as necessary including before or after an organic compound layer-forming step. For example, the average particle diameter of a plate-like alumina particles to be obtained can be adjusted by presence or absence of grinding or classification and the condition selection therefor.

The plate-like alumina particle of the present embodiment or a plate-like alumina particle obtained by the manufacturing method of the present embodiment is preferably aggregated to a small or no extent since the intrinsic properties are easily exhibited, the handleability and dispersibility are further improved when used in a state of being dispersed in a medium to be dispersed. In the method for manufacturing the plate-like alumina particle, it is preferable that a plate-like alumina particle that is aggregated to a small or no extent be obtained without performing the grinding step and the classification step since there is no need to perform the above-described steps and plate-like alumina particles having target excellent properties can be manufactured with high productivity.

[Inorganic Coating Part Forming Step]

Next, an inorganic coating part is formed on the surface of the plate-like alumina particles obtained above. In the present embodiment, an inorganic coating part made of an oxide can be formed. A layer forming method is not particularly limited, and examples thereof include a liquid phase method and a gas phase method.

As inorganic chemical species for forming the inorganic coating part, any of those described above can be used. In a preferred embodiment of the present invention, the inorganic species may include a metal oxide. A method of forming metal oxide coating on the surface of the alumina particles may include mixing a liquid medium dispersion of the alumina particles with a metal oxide itself or a dispersion thereof. If necessary, further filtration and drying can be performed. In addition, in order to obtain particularly outstanding properties, such as increasing the interaction between the alumina particles and the metal oxide; obtaining higher coating properties; obtaining a more uniform inorganic coating part; and preventing the obtained inorganic coating part from being peeled from the alumina particles, a method of forming metal oxide coating on the surface of alumina particles may preferably include mixing a solution of a metal inorganic salt which has solubility in a liquid medium and corresponds to a precursor of the metal oxide, with the alumina particles or a liquid medium dispersion thereof; depositing a fine metal inorganic salt of 150 nm or less on the alumina particles after sufficiently contacting a dissolved molecular metal inorganic salt with the alumina particles; and converting the metal inorganic salt to a metal oxide. If necessary, further filtration and drying can be performed. In the step of converting the metal inorganic salt into a metal oxide, if it is not easy to converting the metal inorganic salt into a metal oxide due to a low temperature or pH change, firing can be performed if necessary. By doing so, a strong interaction between the alumina particles and the metal oxide, which cannot be obtained in the simple mixture, can be obtained. And the above-described particularly outstanding properties can be easily obtained. The firing conditions in the step of forming the inorganic coating part may be adopted by appropriately selecting optimum conditions with reference to the conditions for the alumina particles.

Regarding the liquid phase method, for example, a dispersion solution in which plate-like alumina particles are dispersed is prepared, and as necessary, the pH of the dispersion solution is adjusted and heating is performed. And then, an aqueous solution containing a metal chloride, for example, titanium chloride, is then added dropwise to the dispersion solution. In this case, it is preferable to maintain pH constant with an alkaline aqueous solution. Then, the dispersion solution is stirred for a predetermined time, and filtration, washing, and drying are performed to obtain a powder. Thus, an inorganic coating part made of an oxide such as titanium oxide is formed on the surface of the alumina particles having a plate-like shape. In addition, an inorganic coating part may be formed of iron oxide or silica as another oxide. Moreover, an inorganic coating part may be formed of a plurality of oxides selected from among titanium oxide, iron oxide and silica.

In this step, an inorganic coating part made of a metal in place of an oxide can be formed. In this case, an inorganic coating part can be formed according to a liquid phase method, a gas phase method, or the like, and an inorganic coating part made of, for example, silver, nickel, copper, gold or platinum, is formed on the surface of the alumina particles having a plate-like shape. In addition, an inorganic coating part made of a plurality of metals selected from among silver, nickel, copper, gold, and platinum may be formed.

In addition, in this step, an inorganic coating layer may be formed so that at least a part of the surface of the plate-like alumina particles is coated. In this case, for example, a layer is formed in a state that particles made of a metal oxide or a metal that adhere to each other.

[Organic Compound Layer Forming Step]

In one embodiment, the method of producing composite particles may further include an organic compound layer forming step in which an organic compound layer is formed on the surface of the inorganic coating part (also called the surface of the composite particles) after the inorganic coating part forming step. The organic compound layer forming step is generally performed after the firing step or the post-treatment step.

A method of forming an organic compound layer is not particularly limited, and known methods are appropriately used. Examples thereof include a method in which a solution containing an organic compound is brought into contact with composite particles and dried.

Here, examples of organic compounds used for forming the organic compound layer include an organosilane compound.

(Organosilane Compound)

When composite particles contain silicon atoms and/or inorganic silicon compounds, the surface modification effect described above can be expected unlike the case in which they do not contain silicon atoms and/or inorganic silicon compounds. Moreover, the composite particles contain silicon atoms and/or inorganic silicon compounds can also be used to react with an organosilane compound to obtain a reaction product. Compared to composite particles containing silicon atoms and/or inorganic silicon compounds, the obtained reaction product between the composite particles contain silicon atoms and/or inorganic silicon compounds and an organosilane compound are preferable because affinity with a matrix can be further improved, based on the reaction between silicon atoms and/or inorganic silicon compounds localized on the surface of the composite particles and the organosilane compound.

Examples of organosilane compounds include alkyltrimethoxysilanes with alkyl groups having 1 to 22 carbon atoms such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, alkyltrichlorosilanes, 3,3,3-trifluoropropyltrimethoxysilane, tridecafluoro-1,1,2,2-tetrahydrooctyl)trichlorosilanes, phenyltrimethoxysilane, phenyltriethoxysilane, p-chloromethylphenyltrimethoxysilane, p-chloromethylphenyltriethoxysilanes, γ-glycidoxypropyltrimethoxysilane, γ-glycidoxypropyltriethoxysilane, epoxy silanes such as β-(3,4-epoxycyclohexyl)ethyltrimethoxysilane, aminosilanes such as γ-aminopropyltriethoxysilane, N-β (aminoethyl) γ-aminopropyltrimethoxysilane, N-β(aminoethyl)γ-aminopropylmethyldimethoxysilane, γ-aminopropyltrimethoxysilane, and γ-ureidopropyltriethoxysilane, mercaptosilane such as 3-mercaptopropyltrimethoxysilane, vinylsilane such as p-styryltrimethoxysilane, vinyltrichlorosilane, vinyltris(β-methoxyethoxy) silane, vinyltrimethoxysilane, vinyltriethoxysilane, and γ-methacryloxypropyltrimethoxysilane, and additionally include epoxy-based, amino-based, vinyl-based polymer type silanes. Here, the organosilane compounds may be contained alone or two or more thereof may be contained.

The organosilane compound may be covalently linked to at least a part or all of the silicon atoms and/or the inorganic silicon compound on the surface of the composite particles due to the reaction, and not only a part but also the whole of the composite particles may be coated with the reaction product. Regarding a method of providing the organosilane compound to the surface of the alumina, adhesion by immersion or chemical vapor deposition (CVD) can be used.

The amount of the organosilane compound used is preferably 20 mass % or less and more preferably 0.01 to 10 mass % based on silicon atoms with respect to the mass of silicon atoms or an inorganic silicon compound contained in the surface of the composite particles. When the amount of the organosilane compound used is 20 mass % or less, this is preferable since physical properties derived from the composite particles can be easily exhibited.

The reaction between composite particles containing silicon atoms and/or inorganic silicon compounds and an organosilane compound can be performed according to a known and conventional surface modification method for fillers. For example, a spray method using a fluid nozzle; a dry method using a stirring method, a ball mill, a mixer, which use a shear force; or a wet method using an aqueous or organic solvent, can be used. A treatment using a shear force is desirably performed to the extent that composite particles used in the embodiment do not break.

The temperature in the system in the dry method or the drying temperature after the treatment in the wet method is appropriately determined in a range in which thermal decomposition does not occur depending on the type of the organosilane compound. For example, when the organosilane compound is treated as described above, a temperature of 80 to 150° C. is desired.

<Resin Composition>

In one embodiment, a resin composition containing a resin and composite particles according to the embodiment is provided. The resin is not particularly limited, and examples thereof include a thermosetting resin and a thermoplastic resin.

The resin composition can be cured to obtain a cured product of the resin composition, and can be cured and molded to obtain a molded product of the resin composition. For molding, the resin composition can be appropriately subjected to a treatment such as melting and kneading. Examples of a molding method include compression molding, injection molding, extrusion molding, and foam molding. Among these, extrusion molding using an extrusion molding machine is preferable and extrusion molding using a two-screw extruder is more preferable.

When the resin composition is used as a coating agent, a paint, or the like, the resin composition is applied to an application subject and a coating having a cured product of the resin composition can be formed.

<Method of Producing a Resin Composition>

According to one embodiment of the present invention, a method of producing a resin composition is provided.

The production method includes a step of mixing the composite particles according to the embodiment and a resin. Regarding the composite particles, those described above are used, and thus descriptions thereof will be omitted.

Here, the composite particles subjected to a surface treatment can be used.

In addition, composite particles to be used may be used alone or two or more types thereof may be used in combination.

In addition, a combination of composite particles and other fillers (alumina, spinel, boron nitride, aluminum nitride, magnesium oxide, magnesium carbonate, etc.) may be used.

The content of the composite particles is preferably 5% to 95% by mass, more preferably 10% to 90% by mass, and still more preferably 30% to 80% by mass relative to 100% by mass of the resin composition. The content of the composite particles is preferably 5% by mass or more since the high thermal conduction property of the composite particles can be efficiently exhibited. On the other hand, the content of the resin composition is preferably 95% by mass or less since a resin composition having excellent moldability can be obtained.

In a case where the resin composition is used as a coating agent, paint, or the like, from the viewpoint of exhibiting excellent brilliance and facilitating the formation of a coated film, the content of the composite particles is preferably 0.1% to 95% by mass, more preferably 1% to 50% by mass, and still more preferably 3% to 30% by mass relative to 100% by mass of the mass of the solid content of the resin composition.

(Resin)

The resin is not particularly limited, and examples thereof include a thermoplastic resin and a thermosetting resin.

The thermoplastic resin is not particularly limited, and known and conventional resins used for molding materials and the like may be used. Specific examples thereof include polyethylene resins, polypropylene resins, polymethyl methacrylate resins, polyvinyl acetate resins, ethylene-propylene copolymers, ethylene-vinyl acetate copolymers, polyvinyl chloride resins, polystyrene resins, polyacrylonitrile resins, polyamide resins, polycarbonate resins, polyacetal resins, polyethylene terephthalate resins, polyphenylene oxide resins, polyphenylene sulfide resins, polysulfone resins, polyethersulfone resins, polyetheretherketone resins, polyallylsulfone resins, thermoplastic polyimide resins, thermoplastic urethane resins, polyamino bismaleimide resins, polyamideimide resins, polyetherimide resins, bismaleimide triazine resins, polymethylpentene resins, fluorinated resins, liquid crystal polymers, olefin-vinyl alcohol copolymers, ionomer resins, polyarylate resins, acrylonitrile-ethylene-styrene copolymers, acrylonitrile-butadiene-styrene copolymers, and acrylonitrile-styrene copolymers.

The thermosetting resin is a resin having a characteristic that it can be changed to be substantially insoluble and infusible when curing occurs due to heating, radiation or the presence of a catalyst, and generally, known and conventional resins used for molding materials are used. Specific examples thereof include novolac phenol resins such as phenol novolac resins and cresol novolac resins; phenol resins such as resole phenol resins, for example, unmodified resole phenol resins, and oil-modified resole phenol resins modified with tung oil, linseed oil, walnut oil or the like; bisphenol epoxy resins such as bisphenol A epoxy resins and bisphenol F epoxy resins; novolac epoxy resins such as fatty chain-modified bisphenol epoxy resins, novolac epoxy resins, and cresol novolac epoxy resins; epoxy resins such as biphenyl epoxy resins and polyalkylene glycol epoxy resins; resins having a triazine ring such as urea resins and melamine resins; vinyl resins such as (meth)acrylic resins and vinyl ester resins; and unsaturated polyester resins, bismaleimide resins, polyurethane resins, diallyl phthalate resins, silicone resins, resins having a benzoxazine ring, and cyanate ester resins.

The above resins may be used alone or two or more types thereof may be used in combination. In this case, two or more types of thermoplastic resins may be used, two or more types of thermosetting resins may be used, and one or more types of thermoplastic resins and one or more types of thermosetting resins may be used.

The amount of the resin is preferably 5 to 90 mass % and more preferably 10 to 70 mass % with respect to 100 mass % of the resin composition. When the amount of the resin is 5 mass % or more, this is preferable since excellent moldability can be imparted to the resin composition. On the other hand, when the amount of the resin is 90 mass % or less, this is preferable since it is possible to obtain high thermal conductivity for a compound by molding.

(Curing Agent)

As necessary, a curing agent may be mixed into the resin composition.

The curing agent is not particularly limited, and known agents can be used.

Specific examples thereof include an amine compound, an amide compound, an acid anhydride compound, and a phenolic compound.

Examples of amine compounds include diaminodiphenylmethane, diethylenetriamine, triethylenetetramine, diaminodiphenylsulfone, isophoronediamine, imidazole, $BF_3$-amine complexes, and guanidine derivatives.

Examples of amide compounds include polyamide resins synthesized from dimers of dicyandiamide and linolenic acid, and ethylenediamine.

Examples of acid anhydride compounds include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of phenolic compounds include polyhydric phenolic compounds such as phenol novolac resins, cresol novolac resins, aromatic hydrocarbon formaldehyde resin-modified phenol resins, dicyclopentadiene phenol addition type resins, phenol aralkyl resins (xyloc resins), polyhydric phenol novolac resins synthesized from a polyhydroxy compound represented by a resorcinol novolac resin and formaldehyde, naphthol aralkyl resins, trimethylol methane resins, tetraphenylol ethane resins, naphthol novolac resins, naphthol-phenol co-condensed novolac resins, naphthol-cresol co-condensed novolac resins, biphenyl-modified phenol resins (polyhydric phenolic compound in which phenolic nuclei are inked via a bismethylene group), biphenyl-modified naphthol resins (polyvalent naphthol compound in which phenolic nuclei are linked via a bismethylene group), aminotriazine-modified phenol resins (polyhydric phenolic compound in which phenolic nuclei are linked via melamine, benzoguanamine, or the like) and alkoxy group-containing aromatic ring-modified novolac resins (polyhydric phenolic compound in which phenolic nuclei and alkoxy group-containing aromatic rings are linked via formaldehyde).

One or two or more types of the above curing agents may be used.

(Curing Accelerator)

As necessary, a curing accelerator may be mixed into the resin composition.

The curing accelerator has a function of promoting curing when a composition is cured.

The curing accelerator is not particularly limited, and examples thereof include phosphorus compounds, tertiary amines, imidazoles, organic acid metal salts, Lewis acids, and amine complex salts.

One or two or more types of the above curing accelerators may be.

(Curing Catalyst)

As necessary, a curing catalyst may be mixed into the resin composition.

The curing catalyst has a function of proceeding a curing reaction of a compound having an epoxy group in place of the curing agent.

The curing catalyst is not particularly limited, known and conventional thermal polymerization initiators and active energy ray polymerization initiators are used.

Here, the curing catalysts may be used alone or two or more types thereof may be used in combination.

(Viscosity Adjusting Agent)

As necessary, a viscosity adjusting agent may be mixed into the resin composition.

The viscosity adjusting agent has a function of adjusting the viscosity of a composition.

The viscosity adjusting agent is not particularly limited, and examples thereof include organic polymers, polymer particles, and inorganic particles.

Here, one or a combination of two or more types of the viscosity adjusting agents may be.

(Plasticizer)

As necessary, a plasticizer may be mixed into the resin composition.

The plasticizer has a function of improving processability, flexibility, weatherability, and the like of a thermoplastic synthetic resin.

The plasticizer is not particularly limited, and examples thereof include phthalic acid esters, adipic acid esters, phosphoric acid esters, trimellitic acid esters, polyesters, polyolefins, and polysiloxane.

Here, one or a combination of two or more of the above plasticizers may be.

[Mixing Step]

The resin composition according to the present embodiment can be obtained by mixing composite particles and a resin, and as necessary, other mixtures. The mixing method is not particularly limited, and known and conventional methods are used for mixing.

When the resin is a thermosetting resin, regarding a general method of mixing a thermosetting resin and composite particles, a method in which a predetermined amount of the thermosetting resin added, composite particles, and as necessary, other components, are sufficiently mixed in a mixer or the like, and then kneaded using a three-roller or the like, and thereby a liquid composition having fluidity is obtained may be exemplified. In addition, in another embodiment, regarding a method of mixing a thermosetting resin, composite particles, and the like, a method in which a predetermined amount of the thermosetting resin added, composite particles, and as necessary, other components are sufficiently mixed in a mixer or the like, and then melted and kneaded in a mixing roller, an extruder, or the like and then cooled, and thereby a solid composition is obtained is an exemplary example.

Regarding a mixed state, when a curing agent, a catalyst or the like is added, it is sufficient for a curable resin and a mixture thereof to be sufficiently uniformly mixed, and it is more preferable that composite particles be uniformly dispersed and mixed.

Regarding a general method of mixing a thermoplastic resin, composite particles, and the like when the resin is a thermoplastic resin, a method in which a thermoplastic resin, composite particles, and as necessary, other components, are mixed in advance using various mixers, for example, a tumbler and a Henschel mixer, and then melted and kneaded in a mixer such as a banbury mixer, a roller, a brabender, a single-screw kneading extruder, a two-screw kneading extruder, a kneader, or a mixing roller is an exemplary example. Here, the melt kneading temperature is not particularly limited, and is generally in a range of 100 to 320° C.

In order to further improve fluidity of the resin composition and filling properties of fillers such as composite particles, a coupling agent may be externally added to the resin composition. Here, when the coupling agent is externally added, the adhesion between the resin and composite particles is further improved, the interfacial thermal resistance between the resin and composite particles decreases, and the thermal conductivity of the resin composition is improved.

The above coupling agents may be used alone or two or more types thereof may be used in combination.

The amount of the coupling agent added is not particularly limited, and is preferably 0.01 to 5 mass % and more preferably 0.1 to 3 mass % with respect to the mass of the resin.

According to one embodiment, the resin composition is used for a thermally conductive material.

Since the composite particles contained in the resin composition provide excellent thermal conductivity for the resin composition, the resin composition is preferably used as an insulating heat dissipation member. Therefore, a heat dissipation function of a device can be improved, the size and weight of the device can be reduced, and they can contribute to high performance.

Since the composite particles contained in the resin composition have excellent brilliance, the resin composition is appropriately used as a coating agent, a paint, or the like.

<Method of Producing Cured Product>

According to one embodiment of the present invention, a method of producing a cured product is provided. The production method includes curing the resin composition produced above.

The curing temperature is not particularly limited, and 20 to 300° C. is preferable and 50 to 200° C. is more preferable.

The curing time is not particularly limited, and 0.1 to 10 hours is preferable and 0.2 to 3 hours is more preferable.

The shape of the cured product varies depending on desired applications, and can be appropriately designed by those skilled in the art.

While composite particles having a plate-like shape are used for the resin composition, method of producing a resin composition, and cured product described above, the present invention is not limited thereto, composite particles having a polyhedral shape to be described below may be used.

Second Embodiment

<Composite Particles>

Composite particles according to a second embodiment include alumina particles containing molybdenum (Mo) and an inorganic coating part provided on the surface of the alumina particles. The alumina particles of the present embodiment have a polyhedral shape and the composite particles also have a polyhedral shape. Hereinafter, in the present embodiment, alumina particles having a polyhedral shape will be referred to as "polyhedral alumina particles," "polyhedral alumina," or simply "alumina particles."

<Polyhedral Alumina Particles>

Polyhedral alumina particles of the present embodiment are particles containing molybdenum with a size in the order of µm or less. The order of µm or less means that the average particle size is 1,000 µm or less, and includes a µm range of 1 µm to 1,000 µm and a nm range of less than 1,000 nm.

It is generally known that aluminum oxide having a higher purity exhibits higher thermal conductivity. The reason for this is that an impurity component causes scattering of phonons and reduces thermal conductivity. The alumina particles of the present embodiment exhibit high thermal conductivity despite the fact that they contain molybdenum, and in some case, additionally contain impurities derived from raw materials, and have a small amount of an aluminum oxide component.

It is possible to determine whether an unknown aluminum oxide corresponds to alumina particles used the present invention, for example, based on the presence of coloring. The alumina particles of the present embodiment are not general white particles of aluminum oxide but are light blue to dark blue close to black, and have a characteristic of becoming darker when the amount of molybdenum increases. In addition, when a small amount of other metals is added, for example, when chromium is added, the particles become red, and when nickel is added, the particles become yellow, and the alumina particles of the present embodiment are colored particles that are not white.

[Crystal Form and α-Crystallization Rate]

The alumina particles are aluminum oxide, and the crystal form is not particularly limited, for example, transition alumina of various crystal forms such a γ, δ, θ, and κ may be used, or transition alumina into which alumina hydrate is incorporated may be used. Basically an α crystal form is preferable from the viewpoint of superior mechanical strength and thermal conductivity.

The α-crystallization rate of the alumina particles can be determined through XRD measurement as described above. The α-crystallization rate varies depending on firing conditions and raw materials used, and in order to improve the crushing strength and fluidity of the alumina particles, the α-crystallization rate is preferably 90% or more and more preferably 95% or more.

[Average Particle Size]

The average particle size of alumina particles is preferably 3 μm or more and 300 μm or less and more preferably 10 μm or more 100 μm or less.

Here, in this specification, "average particle size of alumina particles" is a value calculated as a volume-based median size $D_{50}$ from a volume-based cumulative particle size distribution measured using a laser diffraction type dry particle size distribution analyzer.

[Maximum Particle Size]

In addition, a volume-based maximum particle size of alumina particles (hereinafter simply referred to as a "maximum particle size") is not particularly limited, and is generally 1,000 μm or less, and more preferably 500 μm or less.

If the maximum particle size of the alumina particles is larger than the upper limit, this is not preferable because, when the particles are used by being added to a solvent or a binder as a matrix, depending on the form of final applications, there is a risk of alumina particles protruding from the surface of the binder layer, and the occurrence of appearance defects.

In addition, the average particle size of alumina particles and maximum particle size mentioned here can be estimated by, for example, a wet method in which particles are dispersed in an appropriate solvent, specifically, a sample in which alumina particles are dispersed in a pure water medium containing sodium hexametaphosphate and the like as a dispersion stabilizer is measured using a laser diffraction/scattering type particle size distribution measuring device.

In addition, the average particle size and the maximum particle size can be determined by a dry method in which alumina particles themselves are measured using a laser diffraction type particle size distribution analyzer.

[Molybdenum]

The alumina particles according to the embodiment may contain molybdenum. In addition, in the polyhedral alumina particles, molybdenum is preferably contained in the surface layer of the particles. Therefore, it is thought that, by containing molybdenum in the particles, or in the surface layer thereof, the selectivity of an inorganic material constituting an inorganic coating part is improved, and the inorganic coating part can be efficiently formed in the polyhedral alumina particles.

In the method of producing alumina particles to be described below, molybdenum may be derived from a molybdenum compound used as a flux agent.

Molybdenum has a catalyst function and an optical function. In addition, when molybdenum is used, in the production method to be described below, it is possible to produce alumina particles having excellent thermal conductivity.

Molybdenum is not particularly limited, and in addition to molybdenum metal, molybdenum oxides, partially reduced molybdenum compounds, molybdates and the like may be used. Molybdenum in any form among many forms that a molybdenum compound can have or in a combination thereof may be contained in polyhedral alumina particles, and may be incorporated into polyhedral alumina particles as $\alpha$-$MoO_3$, $\beta$-$MoO_3$, $MoO_2$, MoO, a molybdenum cluster structure, or the like.

A form in which molybdenum is contained is not particularly limited, and molybdenum may be contained in a form in which molybdenum adheres to the surface of the polyhedral alumina, a form in which some aluminum of a crystal structure of alumina is replaced with molybdenum, or in a combination thereof.

The amount of molybdenum with respect to 100 mass % of polyhedral alumina particles acquired through XRF analysis is, in terms of molybdenum trioxide ($MoO_3$), preferably 20 mass % or less, and by adjusting a firing temperature, a firing time, and flux conditions, preferably 0.01 mass % or more and 18 mass % or less, more preferably 0.01 mass % or more and 10 mass % or less, and most preferably 0.05 mass % or more and 5 mass % or less. When the amount of molybdenum is 5 mass % or less, this is preferable since the $\alpha$ single crystal quality of alumina can be improved.

In addition, determination of the amount of Mo on the surface of the alumina particles can be performed using the above X-ray photoelectron spectroscopic (XPS) device.

[Potassium]

The alumina particles may further contain potassium.

Potassium may be derived from potassium that can be used as a flux agent in the method of producing alumina particles to be described below.

When potassium is used, in the method of producing alumina particles to be described below, it is possible to produce alumina particles having excellent coating efficiency with high efficiency.

Potassium is not particularly limited, and in addition to potassium metal, potassium oxides, partially reduced potassium compounds, and the like may be used.

A form in which potassium is contained is not particularly limited, and potassium may be contained in a form in which potassium adheres to the surface of the polyhedral alumina, a form in which some aluminum of a crystal structure of alumina is replaced with potassium, or in a combination thereof.

The amount of potassium with respect to 100 mass % of the polyhedral alumina particles acquired through XRF analysis is, in terms of potassium oxide ($K_2O$), preferably 0.01 mass % or more, more preferably 0.01 to 1 mass %, most preferably 0.03 to 0.5 mass %, and particularly preferably 0.05 to 0.3 mass %. Alumina particles in which the amount of potassium is within the above range are preferable because they have a polyhedral shape and an appropriate average particle size value and the like

[Other Atoms]

Other atoms refer to atoms which are intentionally added to alumina particles in order to impart mechanical strength or electric and magnetic functions as long as effects of the present invention are not impaired.

The other atoms are not particularly limited, and examples thereof include zinc, manganese, calcium, strontium, and yttrium. These other atoms may be used alone or two or more types thereof may be used in combination.

The amount of other atoms in the alumina particles with respect to the mass of the alumina particles is preferably 5 mass % or less and more preferably 2 mass % or less.

<Inorganic Coating Part>

The inorganic coating part coats at least a part of the surface of the alumina particles, and is preferably composed of an inorganic coating layer that coats at least a part of the surface of the alumina particles. In other words, at least a part of the surface of the composite particles is coated with the inorganic coating part, and preferably at least a part of the surface of the composite particles is coated with the inorganic coating layer.

As described above, the inorganic coating part is provided on the surface of the alumina particles. "On the surface of the alumina particles" refers to outside the surface of the alumina particles. Therefore, the inorganic coating part formed outside the surface of the alumina particles is clearly distinguished from the surface layer which is formed inside the surface of the alumina particles and contains mullite and germanium.

The inorganic chemical species constituting the inorganic coating part may be relatively larger than the alumina particles. However, it is preferable that the chemical species is relatively smaller than the alumina particles in that the inorganic coating part having an arbitrary coating amount (or coating thickness) can be reliably provided depending on the desired purpose. An example of the combination include alumina particles on the order of μm and inorganic chemical species of 150 nm or less. When an inorganic coating part is provided on the outside of the surface of the alumina particles using an inorganic chemical species smaller than the alumina particles, the inorganic coating part can be provided on a part of the outside of the surface of the alumina particles by using a small amount of the inorganic chemical species, such that the surface of the alumina surface may be clearly observed. Alternatively, the inorganic coating part can be provided on the surface of the alumina particles in a state where the inorganic chemical species are stacked on the surface of the alumina particles by using a large amount of the inorganic chemical species, such that the surface of the alumina particles are no observable. A shape of the inorganic chemical species constituting the inorganic coating part is not limited. For example, the shape is preferably spherical or polyhedral in that it is possible to form the closest-packing structure and reliably mask the surface of the alumina particles with the minimum amount of the inorganic chemical species to be used.

The composite particle of the present invention is composed of alumina particles containing molybdenum and an inorganic coating part made of an inorganic chemical species, and has excellent properties that cannot be expressed by a simple mixture of alumina particles and inorganic chemical species. In the composite particles of the present invention, in the case of a combination of alumina particles containing molybdenum of μm order and non-aggregated inorganic chemical species of 150 nm or less, for example, due to intermolecular force or in some cases local chemical reaction, interaction between the alumina particles and the inorganic chemical species increases. As a result, particularly excellent properties can be reliably expressed, such as higher coating characteristics, a more uniform inorganic coating part, and the obtained inorganic coating part being difficult to be peeled off from the alumina particles. The contribution of molybdenum contained in the alumina particles can also be expected. Independent inorganic species of nm order can be obtained by, for example, mechanically crushing inorganic species of μm order. However, since re-aggregation thereof occurs immediately, the chemical species are not easy to handle. When alumina particles containing no molybdenum or agglomerated inorganic species are used, only a simple mixture of the alumina particles and the inorganic chemical species is formed. Such simple mixture of the alumina particles and the inorganic chemical species do not exhibit the properties of the composite particles of the present invention. According to the composite particle manufacturing method of the present invention described later, composite particles with higher coating efficiency can be manufactured more reliably.

The inorganic coating part can be made of, for example, an oxide or a metal. Examples of oxides include one or more selected from the group consisting of titanium oxide ($TiO_2$), iron oxide ($Fe_2O_3$) and silica ($SiO_2$). Examples of metals include one or more selected from the group consisting of silver (Ag), nickel (Ni), copper (Cu), gold (Au) and platinum (Pt).

The form of the oxide or metal constituting the inorganic coating part is not particularly limited, and examples thereof include particle forms such as a spherical shape, a needle shape, a polyhedral shape, a disk shape, a hollow shape, and a porous form. The average particle size of particles made of an oxide or metal having a particle form is, for example, preferably 1 nm or more and 500 nm or less, and more preferably 5 nm or more and 200 nm or less. The particles made of an oxide or a metal may be crystalline or amorphous.

The inorganic coating part may be composed of one layer or may be composed of a plurality of layers. In addition, when the inorganic coating part is composed of a plurality of layers, the plurality of layers may be composed of different materials.

[XRF Coating Rate of Composite Particles]

The XRF coating rate (%) of the composite particles according to the embodiment can be obtained using, for example, an X-ray fluorescence (XRF) analyzing device to be described below.

The XRF coating rate (%) is obtained based on, for example, the amount of metal oxide constituting the inorganic coating part with respect to the amount of aluminum oxide constituting the alumina particles, and can be obtained, for example, from $[MO_x]/[Al_2O_3]$ (mass ratio) obtained from the XRF analysis results.

[Coating Efficiency of Composite Particles]

The coating efficiency of the composite particles according to the embodiment can be obtained from the ratio of the XRF coating rate with respect to a theoretical coating rate to be described below. The coating efficiency is preferably 30% or more, more preferably 80% or more, and most preferably 90% or more.

<Method of Producing Composite Particles>

Next, a method of producing composite particles according to a first embodiment will be exemplified in detail. The method of producing composite particles according to the present embodiment is not limited to the following method of producing composite particles.

The method of producing composite particles according to the present embodiment includes a step of producing alumina particles by firing a mixture including an aluminum compound containing aluminum element, a molybdenum compound containing molybdenum element, and a shape-controlling agent for controlling the shape of alumina particles, and a step of forming an inorganic coating part on the surface of the alumina particles.

Alumina particles constituting the composite particles according to the embodiment may be obtained based on any production method as long as they contain molybdenum. Alumina particles can be obtained by pulverizing aluminum oxide containing molybdenum having a large size in the order of mm or more to the order of μm, but this is not preferable because a higher energy is necessary to obtain them, and a particle size distribution becomes broad.

Therefore, the alumina particles are preferably aluminum oxide obtained in the step of firing an aluminum compound in the presence of a molybdenum compound because it is then possible to sharpen a particle size distribution without classification, and thermal conductivity is superior and productivity is superior. That is, specifically, regarding the alumina particles used in the present embodiment, in the firing step, a step in which a molybdenum compound reacts with an aluminum compound at a high temperature to form aluminum molybdate and a step in which the aluminum molybdate additionally decomposes into aluminum oxide and molybdenum oxide at a higher temperature are preferably included. In such steps, the molybdenum compound is contained in aluminum oxide particles, and aluminum oxide becomes a high-purity crystal of which the particle size and shape are controlled. Hereinafter, this production method will be referred to as a flux method. The flux method will be described below in detail.

The shape, size, specific surface area, and the like of the alumina particles can be controlled by selecting the ratio between the aluminum compound and molybdenum compound used, the firing temperature, and the firing time.

For example, alumina particles may have various crystal forms such as β, γ, δ, and θ, and basically an α crystal form is preferable from the viewpoint of superior thermal conductivity. The crystal structure of a general α-type aluminum oxide is a closed-packed hexagonal lattice, and the most thermodynamically stable crystal structure is a plate-like shape with the developed [001] plane. However, in the flux method to be described below in detail, by firing an aluminum compound in the presence of a molybdenum compound, the molybdenum compound functions as a flux agent, the α-crystallization rate with a crystal plane other than the [001] plane as a main crystal plane is high, and particularly, alumina particles containing molybdenum having an α-crystallization rate of 90% or more can be more easily formed. The crystal plane other than the [001] plane being the main crystal plane means that the area of the [001] plane is 20% or less with respect to the entire area of the fine particles.

The alumina particles according to the embodiment have a polyhedral shape as described above. When the alumina particles are polyhedral particles, this is advantageous in that they can be easily filled into the resin composition. For example, in the flux method to be described below in detail, when a molybdenum compound is used as a flux agent, polyhedral particles basically close to a sphere can be obtained, and the form of the polyhedral particles close to a sphere is advantageous because they are easily filled into the resin composition. In particular, particles in which the area of the largest flat surface is ⅛ or less of the area of the structure, and particularly the area of the largest flat surface is 1/16 or less of the area of the structure are appropriately obtained.

In addition, if the alumina particles are polyhedral particles, when the particles come in contact with each other in the resin composition, surface contact with high thermal conductivity is thought to occur, and even if the filling rate is the same as in the spherical particles, it is thought that high thermal conductivity can be obtained.

In addition, aluminum oxide obtained by a flux method using a large amount of a flux agent which is generally performed has a hexagonal bipyramidal shape and has an acute angle. Therefore, when a resin composition containing the composite particles according to the present embodiment is produced, problems such as damage to a device occur. However, since aluminum oxide used in the present embodiment does not basically have a hexagonal bipyramidal shape, problems such as damage to a device are unlikely to occur. In addition, since aluminum oxide of the present embodiment is basically a polyhedron with eight or more faces and has a shape close to a spherical shape, it has a feature that problems such as damage to a device are unlikely to occur.

The average particle size of alumina particles is not particularly limited as long as it is 1,000 μm or less, and in consideration of use as a resin composition, preferably 0.1 μm (100 nm) to 100 μm. If the average particle size of alumina particles is 0.1 μm or more, when they are filled into the resin composition, the viscosity of the resin composition is kept low, which is preferable for workability and the like. In addition, when the average particle size of aluminum oxide used in the present invention is 100 μm or less, for example, in a thermoplastic resin composition, the surface of the molded product is less likely to be rough and a favorable molded product can be easily obtained. In addition, for example, a thermosetting resin composition is preferable because, when a substrate and a substrate are bonded, the adhesive strength at the interface between the cured product and the substrate does not decrease, and crack resistance in a cooling and heating cycle and the like and peelability at the adhesive interface are excellent. For the same reason as described above, a more preferable average particle size of aluminum oxide used in the present invention is 1 μm to 50 μm.

In addition, for example, in the flux method to be described below in detail, the specific surface area of alumina particles obtained from the aluminum compound as a raw material is significantly reduced by firing compared with the aluminum compound. Depending on properties of the aluminum compound and firing conditions, the specific surface area of the obtained alumina particles is in a range of 0.0001 m$^2$/g to 50 m$^2$/g and those having a range of 0.001 m$^2$/g to 10 m$^2$/g are appropriately obtained.

In a flux method using a molybdenum compound as a flux agent, although most of the molybdenum compound used sublimates due to a firing treatment at a high temperature, some of molybdenum remains and aluminum oxide containing molybdenum is obtained. The amount of molybdenum in alumina particles is preferably 10 mass % or less, and the amount that is reduced to 1 mass % or less by adjusting a firing temperature, a firing time, and a molybdenum compound sublimation rate is more appropriate.

The form of molybdenum contained in the alumina particles is not particularly limited, and examples thereof include a molybdenum compound such as molybdenum metal, molybdenum trioxides and partially reduced molybdenum dioxide and a form in which some of aluminum in the structure of aluminum oxide is replaced with molybdenum.

(Aluminum Compound)

The aluminum compound in the present embodiment is a compound including an aluminum element and a raw material of the plate-like alumina particle according to the embodiment. The aluminum compound is not particularly limited as long as the aluminum compound is turned into an alumna particle by a heat treatment, and it is possible to use, for example, aluminum chloride, aluminum sulfate, basic aluminum acetate, aluminum hydroxide, boehmite, pseudoboehmite, transition alumina (γ-alumina, δ-alumina, θ-alumina, or the like), α-alumina, mixed alumina particles having two or more kinds of crystal phases, or the like, and the physical forms such as shape, particle diameter, and specific surface area of the aluminum compound as a precursor are not particularly limited.

According to the flux method described in detail below, it is possible to preferably use the aluminum compound regardless of the shape of the aluminum compound in the embodiment such as any one of a spherical structure, an irregular shape, a structure having an high aspect ratio (for example, a wire, a fiber, a ribbon, a tube, or the like), a sheet, and the like.

Similarly, according to the flux method described in detail below, regarding the particle diameter of the aluminum compound, it is possible to preferably use a solid of the aluminum compound having a particle diameter of several nanometers to several hundreds of micrometers.

The specific surface area of the aluminum compound is not particularly limited. A larger specific surface area is preferable because it allows the molybdenum compound to act effectively. However, those having any specific surface area can be used as raw materials by adjusting firing conditions and an amount of the molybdenum compound used.

In addition, the aluminum compound may be the aluminum compound alone or a composite body of the aluminum compound and the organic compound. For example, an organic/inorganic composite body obtained by modifying the aluminum compound by using an organosilane, an aluminum compound composite body to which a polymer is adsorbed, and the like can also be preferably used. In the case of using these composite bodies, the content rate of the organic compound is not particularly limited, and the content rate is preferably 60% by mass or less and more preferably 30% by mass or less since it is possible to efficiently manufacture the plate-like alumina particle.

(Molybdenum Compound)

The molybdenum compound may be, for example, molybdenum oxide or a compound containing acid radical anions ($MoO_x^{n-}$) formed by a bond of a molybdenum metal and oxygen.

The compound containing acid radical anions formed by a bond of a molybdenum metal and oxygen is not particularly limited as long as it can be converted into molybdenum trioxide due to firing at a high temperature. Regarding such a molybdenum compound, for example, molybdic acid, hexaammonium heptamolybdate, diammonium molybdate, phosphomolybdic acid, molybdenum disulfide, and the like can be appropriately used.

The amount of the molybdenum compound used is not particularly limited, and is preferably 0.01 to 1 mol, more preferably 0.015 to 0.8 mol, and most preferably 0.02 to 0.6 mol as the molybdenum metal of the molybdenum compound with respect to 1 mol of an aluminum metal of the aluminum compound. In addition, if the flux method is used, when a molybdenum compound is used as a flux agent, since molybdenum is contained in the alumina particles, using this as evidence, it is possible to determine a production method by which unknown alumina particles are produced.

(Potassium Compound)

In the flux method, the mixture may further contain a potassium compound containing potassium. That is, a molybdenum compound and a potassium compound are preferably used as a flux agent.

When a molybdenum compound and a potassium compound are used as a flux agent, the potassium compound is not particularly limited, and examples thereof include potassium chloride, potassium chlorite, potassium chlorate, potassium sulfate, potassium hydrogen sulfate, potassium hydrogen sulfite, potassium bisulfite, potassium nitrate, potassium carbonate, potassium bicarbonate, potassium acetate, potassium oxide, potassium bromide, potassium bromate, potassium hydroxide, potassium silicate, potassium phosphate, potassium hydrogen phosphate, potassium sulfide, potassium hydrogen sulfide, potassium molybdate, and potassium tungstate. In this case, the potassium compound contains an isomer like the molybdenum compound. Among these, potassium carbonate, potassium bicarbonate, potassium oxide, potassium hydroxide, potassium chloride, potassium sulfate, or potassium molybdate is preferably used, and potassium carbonate, potassium bicarbonate, potassium chloride, potassium sulfate, or potassium molybdate is more preferably used.

Here, the above potassium compounds may be used alone or two or more types thereof may be used in combination.

The potassium compound contributes to efficient formation of mullite in the surface layer of alumina. In addition, the potassium compound contributes to efficient formation of a layer containing germanium in the surface layer of alumina.

In addition, the potassium compound is preferably used as a flux agent together with the molybdenum compound.

Among the above compounds, since potassium molybdate contains molybdenum, it has a function as the above molybdenum compound. When potassium molybdate is used as a flux agent, the same effects as when a molybdenum compound and a potassium compound are used as a flux agent can be obtained.

As a potassium compound that is used when a raw material is prepared or produced in a reaction in a temperature raising process during firing, a water-soluble potassium compound, for example, potassium molybdate, can be easily collected by washing after firing without being vaporized even in a firing temperature range. Therefore, an amount of the molybdenum compound released to the outside of the firing furnace is also reduced, and production costs can be significantly reduced.

When the molybdenum compound and the potassium compound are used as a flux agent, the molar ratio of molybdenum element of the molybdenum compound to potassium element of the potassium compound (molybdenum element/potassium element) is preferably 5 or less, more preferably 0.01 to 3, and most preferably 0.5 to 1.5 because production costs can be further reduced. When the molar ratio (molybdenum element/potassium element) is within the above range, this is preferable since alumina particles having a large particle size can be obtained.

(Metal Compound)

As will be described below, the metal compound has a function of promoting crystal growth of alumina. The metal compound can be used during firing as desired. Here, since the metal compound is used for promoting crystal growth of α-alumina, the metal compound is not an essential constitution for producing the alumina particles according to the present invention.

The metal compound is not particularly limited, and preferably includes at least one selected from the group consisting of Group II metal compounds and Group III metal compounds.

Examples of Group II metal compounds include magnesium compounds, calcium compounds, strontium compounds, and barium compounds.

Examples of Group III metal compounds include scandium compounds, yttrium compounds, lanthanum compounds, and cerium compounds.

Here, the above metal compounds refer to oxides, hydroxides, carbonates, and chlorides of metal elements. For example, in the case of an yttrium compound, yttrium oxide ($Y_2O_3$), yttrium hydroxide, and carbonated yttrium may be exemplified. Among these, the metal compound is preferably an oxide of a metal element. Here, such a metal compound includes an isomer.

Among these, metal compounds of period 3 elements, metal compounds of period 4 elements, metal compounds of period 5 elements, or metal compounds of period 6 elements are preferable, metal compounds of period 4 elements or metal compounds of period 5 elements are more preferable, and metal compounds of period 5 elements are most preferable. Specifically, a magnesium compound, a calcium compound, an yttrium compound, or a lanthanum compound is preferably used, a magnesium compound, a calcium compound, or an yttrium compound is more preferably used, and an yttrium compound is particularly preferably used.

An amount of the metal compound added with respect to the value in terms of mass of aluminum atoms in the aluminum compound is preferably 0.02 to 20 mass % and more preferably 0.1 to 20 mass %. When an amount of the metal compound added is 0.02 mass % or more, this is preferable since crystal growth of α-alumina containing molybdenum can proceed appropriately. On the other hand, when an amount of the metal compound added is 20 mass % or less, this is preferable since it is possible to obtain alumina particles having a small amount of impurities derived from the metal compound.

(Yttrium)

When the aluminum compound is fired in the presence of an yttrium compound as a metal compound, in this firing step, crystal growth proceeds more appropriately, and α-alumina and a water-soluble yttrium compound are produced. In this case, since the water-soluble yttrium compound is likely to be localized on the surface of α-alumina as alumina particles, as necessary, washing with water, alkaline water, a liquid in which these are warmed, or the like is performed, and thus the yttrium compound can be removed from the alumina particles.

When the molybdenum compound is used as a flux agent, amounts of the aluminum compound and the molybdenum compound used are not particularly limited. For example, when a total amount of raw materials in terms of oxide is set as 100 mass %, the following mixture may be fired.

1) A mixture in which
  70 mass % or more of an aluminum compound containing aluminum element in terms of $Al_2O_3$, and
  1 mass % or more of a molybdenum compound in terms of $MoO_3$
  are mixed.

In the above 1), when a total amount of raw materials in terms of oxide is set as 100 mass %, the amount of the molybdenum compound in terms of $MoO_3$ is preferably 1 mass % or more, more preferably 1 mass % or more and 10 mass % or less, and most preferably 2 mass % or more and 8 mass % or less.

When a molybdenum compound and a potassium compound are used as flux agent, amounts of the aluminum compound, molybdenum compound, potassium compound, and yttrium compound used are not particularly limited, and for example, when a total amount of raw materials in terms of oxide is set as 100 mass %, the following mixture may be fired.

2) A mixture in which
  30 mass % or more of an aluminum compound containing aluminum element in terms of $Al_2O_3$,
  30 mass % or more of a molybdenum compound in terms of $MoO_3$,
  10 mass % or more of a potassium compound in terms of $K_2O$, and
  0.05 mass % or more of an yttrium compound in terms of $Y_2O_3$
  are mixed.

In the above 2), when the total amount of raw materials in terms of oxide is set as 100 mass %, the amount of the molybdenum compound in terms of $MoO_3$ is preferably 30 mass % or more, more preferably 30 mass % or more and 60 mass % or less, and most preferably 40 mass % or more and 50 mass % or less.

In the above 2), when a total amount of raw materials in terms of oxide is set as 100 mass %, the amount of the potassium compound in terms of $K_2O$ is preferably 10 mass % or more, more preferably 10 mass % or more and 30 mass % or less, and most preferably 12 mass % or more and 20 mass % or less.

In addition, in the above 2), when a total amount of raw materials in terms of oxide is set as 100 mass %, the amount of the yttrium compound in terms of $Y_2O_3$ is preferably 0.05 mass % or more, more preferably 0.05 mass % or more and 1 mass % or less, and most preferably 0.1 mass % or more and 0.5 mass % or less.

[Firing Step]

The firing step is a step of firing an aluminum compound in the presence of a molybdenum compound. As described above, this production method is called a flux method. In the resin composition of the present invention, aluminum oxide containing molybdenum with the order of μm or less is contained. Therefore, a production method in which a large amount of a molybdenum compound is used as a flux agent and which takes a considerably long time is not preferable because aluminum oxide containing molybdenum having a large size in the order of mm or more order is produced.

The firing method is not particularly limited, and known and conventional methods can be used. When the firing temperature exceeds 700° C., an aluminum compound reacts with a molybdenum compound to form aluminum molybdate. In addition, when the firing temperature is 900° C. or higher, aluminum molybdate is obtained by incorporating a molybdenum compound into aluminum oxide particles when aluminum molybdate decomposes into aluminum oxide and molybdenum oxide.

In addition, during firing, the states of the aluminum compound and the molybdenum compound are not particularly limited as long as the molybdenum compound is provided in the same space so that it can act on the aluminum compound. Specifically, even in a state in which both are not mixed, simple mixing of mixing powders, mechanical mixing using a grinding machine or the like, and mixing using a mortar or the like may be used, and mixing in a dry state or a wet state may be performed.

A firing temperature condition is not particularly limited, and is appropriately determined according to the particle size, the form, and the like of desired alumina particles. Generally, the firing temperature may be 900° C. or higher which is a temperature equal to or higher than a decomposition temperature of aluminum molybdate ($Al_2(MoO_4)_3$). In particular, in polyhedral particles close to spheres, in order to efficiently form alumina particles used in the present invention having an α-crystallization rate of 90% or more, firing is preferably performed in a range of 950 to 1,100° C., and most preferably in a range of 970 to 1,050° C.

Generally, when it is intended to control the shape of α-alumina obtained after firing, it is necessary to perform firing at a high temperature of 2000° C. or higher that is close to the melting temperature of α-alumina, which creates a significant problem in industrial use from the viewpoint of the load on a firing furnace or fuel costs.

Alumina particles can also be produced at a high temperature exceeding 2,000° C. However, when the flux method is used, aluminum oxide having a high α-crystallization rate and a polyhedral shape can be formed also at a temperature much lower than the melting point of α-alumina of 1,600° C. or lower regardless of the shape of the precursor.

In the above flux method, even if the maximum firing temperature condition is 900° C. to 1,600° C., it is possible to efficiently form aluminum oxide particles which are nearly spherical and have an α-crystallization rate of 90% or more and high thermal conductivity at low cost. Firing at a maximum temperature of 950 to 1,500° C. is more preferable, and firing at a maximum temperature in a range of 1,000 to 1,400° C. is most preferable.

Regarding the firing time, firing is performed for a temperature raising time in a range of 15 minutes to 10 hours to reach a predetermined maximum temperature, and preferably a holding time at the firing maximum temperature is in a range of 5 minutes to 30 hours. In order to efficiently form alumina particles, a firing holding time of about 10 minutes to 5 hours is more preferable.

The firing atmosphere is not particularly limited as long as effects of the present invention are obtained. For example, an oxygen-containing atmosphere such as air or oxygen, or an inert atmosphere such as nitrogen, argon, or carbon dioxide is preferable, and an air atmosphere is more preferable in consideration of costs.

An apparatus for firing is not always limited, and a so-called firing furnace can be used. The firing furnace is preferably configured of a material that does not react with sublimated molybdenum oxide, and a highly airtight firing furnace is preferably used so as to more efficiently use molybdenum oxide.

In addition, in order to adjust the crystal state of alumina particles or to remove impurities on the surface of the particles, after aluminum oxide containing molybdenum is formed, additionally firing may be performed at a high temperature equal to or higher than the temperature at which alumina particles are formed.

The alumina particles are preferably obtained by firing an aluminum compound in the presence of a molybdenum compound and a potassium compound or in the presence of a molybdenum compound, a potassium compound and a metal oxide.

That is, a preferable method of producing alumina particles includes a step of firing an aluminum compound in the presence of a molybdenum compound and a potassium compound or in the presence of a molybdenum compound, a potassium compound and a metal oxide (firing step). Preferably, the mixture further contains the above metal compound. Regarding the metal compound, an yttrium compound is preferable.

In the flux method using a molybdenum compound, molybdenum oxide reacts with an aluminum compound to form aluminum molybdate, and next, change in chemical potential during decomposition of aluminum molybdate serves as a driving force for crystallization, and thus hexagonal bipyramidal polyhedral particles with the developed euhedral face (113) are formed. Therefore, when the molybdenum compound is used as a flux agent, it is possible to more easily form alumina particles having a high α-crystallization rate and particularly made of polyhedral alumina containing molybdenum having an α-crystallization rate of 90% or more.

Here, even if effects of the present invention are obtained through a mechanism different from the above mechanism, the mechanism is included in the technical scope of the present invention.

[Cooling Step]

When a molybdenum compound and a potassium compound are used as a flux agent, the method of producing alumina particles may include a cooling step. The cooling step is a step of cooling alumina of which a crystal is grown in the firing step. More specifically, it may be a step of cooling a composition including the alumina obtained in the firing step and a flux agent in a liquid phase.

The cooling rate is not particularly limited, and 1 to 1,000° C./hour is preferable, 5 to 500° C./hour is more preferable, and 50 to 100° C./hour is most preferable. When the cooling rate is 1° C./hour or more, this is preferable since the production time can be shortened. On the other hand, when the cooling rate is 1,000° C./hour or less, this is preferable since the firing container is less likely to break due to heat shock and can be used for a long time.

The cooling method is not particularly limited, and natural cooling or a cooling device may be used.

[Post-Treatment Step]

The method of producing composite particles according to the embodiment may include a post-treatment step. The post-treatment step is a post-treatment step for polyhedral particles and is a step of removing the flux agent. The post-treatment step may be performed after the above firing step, may be performed after the above cooling step, or may be performed after the firing step and the cooling step. In addition, as necessary, this step may be repeated twice or more.

Examples of post-treatment methods include washing and a high temperature treatment. These can be performed in combination.

The washing method is not particularly limited, and the flux agent can be removed by washing with water, an ammonia aqueous solution, a sodium hydroxide aqueous solution, or an acidic aqueous solution.

In this case, it is possible to control the amount of molybdenum by appropriately changing the concentration and amount of water, an ammonia aqueous solution, a sodium hydroxide aqueous solution, or an acidic aqueous solution used; a washing part; a washing time; and the like.

In addition, examples of high temperature treatment methods include a method of raising the temperature to a sublimation point or boiling point or higher of the flux.

[Inorganic Coating Part Forming Step]

Next, an inorganic coating part is formed on the surface of the polyhedral particles obtained above. In the present embodiment, an inorganic coating part made of an oxide can be formed. A layer forming method is not particularly limited, and examples thereof include a liquid phase method and a gas phase method.

As inorganic chemical species for forming the inorganic coating part, any of those described above can be used. In a preferred embodiment of the present invention, the inorganic species may include a metal oxide. A method of forming metal oxide coating on the surface of the alumina particles may include mixing a liquid medium dispersion of the alumina particles with a metal oxide itself or a dispersion thereof. If necessary, further filtration and drying can be performed. In addition, in order to obtain particularly outstanding properties, such as increasing the interaction between the alumina particles and the metal oxide; obtaining higher coating properties; obtaining a more uniform inorganic coating part; and preventing the obtained inorganic coating part from being peeled from the alumina particles, a method of forming metal oxide coating on the surface of alumina particles may preferably include mixing a solution of a metal inorganic salt which has solubility in a liquid medium and corresponds to a precursor of the metal oxide, with the alumina particles or a liquid medium dispersion thereof; depositing a fine metal inorganic salt of 150 nm or less on the alumina particles after sufficiently contacting a dissolved molecular metal inorganic salt with the alumina particles; and converting the metal inorganic salt to a metal oxide. If necessary, further filtration and drying can be performed. In the step of converting the metal inorganic salt into a metal oxide, if it is not easy to converting the metal inorganic salt into a metal oxide due to a low temperature or pH change, firing can be performed if necessary. By doing so, a strong interaction between the alumina particles and the metal oxide, which cannot be obtained in the simple mixture, can be obtained. And the above-described particularly outstanding properties can be easily obtained. The firing conditions in the step of forming the inorganic coating part may be adopted by appropriately selecting optimum conditions with reference to the conditions for the alumina particles.

Regarding the liquid phase method, for example, a dispersion solution in which alumina particles are dispersed is prepared, and as necessary, the pH of the dispersion solution is adjusted and heating is performed. And then, an aqueous solution containing a metal chloride, for example, titanium chloride, is then added dropwise to the dispersion solution. In this case, it is preferable to maintain pH constant with an alkaline aqueous solution. Then, the dispersion solution is stirred for a predetermined time, and filtration, washing, and drying are performed to obtain a powder. Thus, an inorganic coating part made of an oxide such as titanium oxide is formed on the surface of the alumina particles having a polyhedral shape. In addition, an inorganic coating part may be formed of iron oxide or silica as another oxide. Moreover, an inorganic coating part may be formed of a plurality of oxides selected from among titanium oxide, iron oxide and silica.

In this step, an inorganic coating part made of a metal in place of an oxide can be formed. In this case, an inorganic coating part can be formed according to a liquid phase method, a gas phase method, or the like, and an inorganic coating part made of, for example, silver, nickel, copper, gold or platinum, is formed on the surface of the alumina particles having a polyhedral shape. In addition, an inorganic coating part made of a plurality of metals selected from among silver, nickel, copper, gold, and platinum may be formed.

In addition, in this step, an inorganic coating layer may be formed so that at least a part of the surface of the alumina particles is coated. In this case, for example, a layer is formed in a state that particles made of a metal oxide or a metal that adhere to each other.

EXAMPLES

While the present invention will be described below in more detail with reference to examples, the present invention is not limited to the following examples.

Example 1

First, a plate-like alumina serving as a substrate of composite particles was produced. 146.2 g (92.2 mass % in terms of oxide of $Al_2O_3$) of aluminum hydroxide (with an average particle size of 10 μm, commercially available from Nippon Light Metal Co., Ltd.), 5.0 g (4.9 mass % in terms of oxide of $MoO_3$) of molybdenum trioxide (commercially available from Taiyo Koko Co., Ltd.), and 3.0 g (2.9 mass % in terms of oxide of $SiO_2$) of silicon dioxide (with an average particle size of 3 μm, commercially available from Fuji Silysia Chemical, Ltd.) were mixed in a mortar to obtain a mixture. The obtained mixture was put into a crucible and heated to 1,100° C. in a ceramic electric furnace under a condition of 5° C./min, and left at 1,100° C. for 10 hours, and fired. Then, under a condition of 5° C./min, the temperature was lowered to room temperature and the crucible was then removed, and 98.0 g of a light blue powder was obtained. The obtained powder was ground in a mortar until it passed through a 2 mm sieve.

Subsequently, 95.0 g of the obtained light blue powder was dispersed in 300 mL of 0.25% ammonia water, the dispersion solution was stirred at room temperature (25 to 30° C.) for 3 hours, and then passed through a 106 μm sieve, ammonia water was removed by filtration, washing with water and drying were performed to remove molybdenum remaining on the surface of the particles, and thereby 90.0 g of a light blue powder was obtained. Plate-like alumina particles having a $D_{50}$ value of 5 μm were obtained.

Next, 5 g of the plate-like alumina particles having a $D_{50}$ value of 5 μm was dispersed in 45 mL of water to obtain a dispersion solution. The pH of the dispersion solution was adjusted to 1.8 using 1 Mol HCl, and at the same time, the temperature of the dispersion solution was adjusted to 70° C. While stirring the dispersion solution, 23 g of a 1.5% $TiCl_4$ aqueous solution was added dropwise within 8 hours (theoretical coating rate of 11.1%). At the same time, the pH of the dispersion solution was maintained at 1.8 using 39 g of a 2% NaOH aqueous solution. After the $TiCl_4$ aqueous solution was added dropwise, the dispersion solution was additionally stirred for 4 hours, and the dispersion solution was filtered and washed with water. After drying at 110° C. for 10 hours, 5.32 g of a powder was obtained.

5.32 g of the powder was fired at 800° C. for 2 hours. Thereby, 5.30 g of a sample of plate-like alumina particles coated with titanium oxide was obtained.

Example 2

Plate-like alumina particles having a $D_{50}$ value of 5 μm were produced in the same production method as in Example 1. 7.5 g of the plate-like alumina was dispersed in 75 mL of water to obtain a dispersion solution. The pH of the dispersion solution was adjusted to 2.7 using 1 Mol HCl, and at the same time, the temperature of the dispersion solution was adjusted to 75° C. While stirring the dispersion solution, a 8.1% $FeCl_3$ aqueous solution was added dropwise at a rate of 0.17 g/min within 2 hours (theoretical coating rate of 11.1%). At the same time, the pH of the dispersion solution was maintained at 2.7 using 20 g of a 5% NaOH aqueous solution. After the $FeCl_3$ aqueous solution was added dropwise, the dispersion solution was additionally stirred for 4 hours, and the dispersion solution was filtered and washed with water. After drying at 110° C. for 10 hours, 8.25 g of a powder was obtained.

5 g of the powder was fired at 800° C. for 2 hours. Thereby, 4.90 g of a sample of plate-like alumina particles coated with iron oxide(III) was obtained. The color of these composite particles was reddish brown.

Example 3

5.0 g of a sample of plate-like alumina particles coated with titanium oxide was obtained in the same manner as in Example 1 except that the plate-like alumina particles having a $D_{50}$ value of 13 μm were used.

Example 4

Plate-like alumina particles having a $D_{50}$ value of 13 μm were produced in the same production method as in Example 3.

5.0 g of a sample of plate-like alumina particles coated with iron oxide(III) was obtained in the same manner as in Example 2 except that the plate-like alumina particles having a $D_{50}$ value of 13 μm were used. The color of these composite particles was reddish brown.

Example 5

5.0 g of a sample of plate-like alumina particles coated with iron oxide(III) was obtained in the same manner as in Example 4 except that a time for which an $FeCl_3$ aqueous solution was added dropwise was changed to be within 4 hours. The color of these composite particles was reddish brown.

Example 6

5.0 g of a sample of plate-like alumina particles coated with iron oxide(III) was obtained in the same manner as in Example 4 except that a time for which an $FeCl_3$ aqueous solution was added dropwise was changed to be within 7 hours. The color of these composite particles was reddish brown.

Example 7

Plate-like alumina particles serving as a substrate of composite particles were produced. 100 g (90.1 mass % in terms of oxide of $Al_2O_3$) of generally commercially available aluminum hydroxide (with an average particle size of 1 to 2 μm), 6.5 g (9.0 mass % in terms of oxide of $MoO_3$) of molybdenum trioxide (commercially available from Taiyo Koko Co., Ltd.), and 0.65 g (0.9 mass % in terms of oxide of $SiO_2$) of silicon dioxidesilicon (special grade, commercially available from Kanto Chemical Co., Inc.) were mixed in a mortar to obtain a mixture. The obtained mixture was put into a crucible and heated to 1,200° C. in a ceramic electric furnace under a condition of 5° C./min and left at 1,200° C. for 10 hours, and fired. Then, under a condition of 5° C./min, the temperature was lowered to room temperature and the crucible was then removed, and 67.0 g of a light blue powder was obtained. The obtained powder was ground in a mortar until it passed through a 2 mm sieve.

Subsequently, 65.0 g of the obtained light blue powder was dispersed in 250 mL of 0.25% ammonia water, the dispersion solution was stirred at room temperature (25 to 30° C.) for 3 hours, and then passed through a 106 μm sieve, ammonia water was removed by filtration, washing with water and drying were performed to remove molybdenum remaining on the surface of the particles, and thereby 60.0 g of a light blue powder was obtained. Plate-like alumina particles having a $D_{50}$ value of 28 μm were obtained.

According to SEM observation, it was confirmed that the obtained powder was plate-like alumina particles having a polygonal plate-like shape and in which there were very few aggregates, and which had excellent handling properties. In addition, when XRD measurement was performed, a sharp scattering peak derived from α-alumina appeared, no alumina crystal peak other than the α crystal structure was observed, and the plate-like alumina had a dense crystal structure. In addition, it was confirmed that the obtained particles contained 0.61% of molybdenum in terms of molybdenum trioxide based on X-ray fluorescence quantitative analysis results.

Then, 5.0 g of a sample of plate-like alumina particles coated with titanium oxide was obtained in the same manner as in Example 1 except that plate-like alumina particles having a $D_{50}$ value of 28 μm were obtained.

Example 8

Plate-like alumina particles having a $D_{50}$ value of 28 μm were produced in the same production method as in Example 7.

5.0 g of a sample of plate-like alumina particles coated with iron oxide(III) was obtained in the same manner as in Example 2 except that the plate-like alumina particles having a $D_{50}$ value of 28 μm was used and a time for which an $FeCl_3$ aqueous solution was added dropwise was changed to be within 1 hour. The color of these composite particles was reddish brown.

Example 9

Plate-like alumina particles having a $D_{50}$ value of 28 μm were produced in the same production method as in Example 7.

5.0 g of a sample of plate-like alumina particles coated with iron oxide(III) was obtained in the same manner as in Example 2 except that the plate-like alumina particles having a $D_{50}$ value of 28 μm was used. The color of these composite particles was reddish brown.

Example 10

5.0 g of a sample of plate-like alumina particles coated with iron oxide(III) was obtained in the same manner as in Example 9 except that a time for which an $FeCl_3$ aqueous solution was added dropwise was changed to be within 4 hours. The color of these composite particles was reddish brown.

Example 11

5.0 g of a sample of plate-like alumina particles coated with iron oxide(III) was obtained in the same manner as in Example 9 except that a time for which an $FeCl_3$ aqueous solution was added dropwise was changed to be within 7 hours. The color of these composite particles was reddish brown.

Example 12

5.0 g of a sample of plate-like alumina particles coated with iron oxide(III) was obtained in the same manner as in Example 9 except that a time for which an $FeCl_3$ aqueous solution was added dropwise was changed to be within 11 hours. The color of these composite particles was reddish brown.

Example 13

5.0 g of a sample of plate-like alumina particles coated with titanium oxide was obtained in the same manner as in Example 1 except that germanium dioxide was used in place of silicon dioxide, and 100 g (90.1 mass % in terms of oxide of $Al_2O_3$) of generally commercially available aluminum hydroxide (with an average particle size of 1 to 2 μm), 6.5 g (9.0 mass % in terms of oxide of $MoO_3$) of molybdenum trioxide (commercially available from Taiyo Koko Co., Ltd.), and 0.65 g (0.9 mass % in terms of oxide of $GeO_2$) of germanium dioxide (commercially available from Mitsubishi Materials Electronic Chemicals Co., Ltd.) were mixed in a mortar to obtain a mixture.

Example 14

Plate-like alumina particles serving as a substrate of composite particles were produced. 50 g (35.9 mass % in terms of oxide of $Al_2O_3$) of aluminum oxide (CHALCO, commercially available from Shandong, transition alumina, average particle size of 45 µm), 67 g (48.2 mass % in terms of oxide of $MoO_3$) of molybdenum trioxide (commercially available from Taiyo Koko Co., Ltd.), 0.025 g (0.0 mass % in terms of oxide of $SiO_2$) of silicon dioxide (commercially available from Kanto Chemical Co., Inc.), 32 g (15.7 mass % in terms of oxide of $K_2O$) of potassium carbonate (commercially available from Kanto Chemical Co., Inc.), and 0.25 g (0.2 mass % in terms of oxide of $Y_2O_3$) of yttrium oxide (commercially available from Kanto Chemical Co., Inc.) were mixed in a mortar to obtain a mixture. The obtained mixture was put into a crucible and heated to 1,000° C. in a ceramic electric furnace under a condition of 5° C./min, and left at 1,000° C. for 24 hours, and fired. Then, under a condition of 5° C./min, the temperature was lowered to room temperature and the crucible was then removed, and 136 g of a light blue powder was obtained.

Subsequently, 136 g of the obtained light blue powder was washed with about 1% sodium hydroxide aqueous solution. Next, washing with pure water was performed while continuing vacuum filtration. Drying was performed at 110° C. and 47 g of plate-like alumina particles made of α-alumina as a light blue powder were obtained. Plate-like alumina particles having a $D_{50}$ value of 50 µm were obtained.

Then, 5.0 g of a sample of plate-like alumina particles coated with titanium oxide was obtained in the same manner as in Example 1 except that the plate-like alumina particles having a $D_{50}$ value of 50 µm were used.

Example 15

Polyhedral alumina particles serving as a substrate of composite particles were produced. 50 g (35.7 mass % in terms of oxide of $Al_2O_3$) of aluminum oxide (CHALCO, commercially available from Shandong, transition alumina, average particle size of 45 µm), 66.75 g (47.7 mass % in terms of oxide of $MoO_3$) of molybdenum trioxide (commercially available from Aladdin Industrial Corporation), 33.75 g (16.4 mass % in terms of oxide of $K_2O$) of potassium carbonate (commercially available from Aladdin Industrial Corporation), and 0.25 g (0.2 mass % in terms of oxide of $Y_2O_3$) of yttrium oxide (commercially available from Aladdin Industrial Corporation) were mixed in a mortar to obtain a mixture. The obtained mixture was put into a crucible and heated to 950° C. in a ceramic electric furnace under a condition of 5° C./min and left for 10 hours and fired. Then, under a condition of 5° C./min, the temperature was lowered to room temperature and the crucible was then removed, and the content was washed with deionized water. Finally, drying was performed at 150° C. for 2 hours, and a blue α-alumina powder containing molybdenum was obtained. Polyhedral alumina particles having a $D_{50}$ value of 50 µm were obtained.

Then, 5.0 g of a sample of polyhedral alumina particles coated with titanium oxide was obtained in the same manner as in Example 1 except that the polyhedral alumina particles having a $D_{50}$ value of 50 µm were used.

Example 16

Polyhedral alumina particles serving as a substrate of composite particles were produced. 146.2 g (95.0 mass % in terms of oxide of $Al_2O_3$) of aluminum hydroxide (with an average particle size of 12 µm, commercially available from Nippon Light Metal Co., Ltd.), and 5.0 g (5.0 mass % in terms of oxide of $MoO_3$) of molybdenum trioxide (commercially available from Taiyo Koko Co., Ltd.) were mixed in a mortar to obtain a mixture. The obtained mixture was put into a crucible and heated to 1,000° C. in a ceramic electric furnace under a condition of 5° C./min and left at 1,000° C. for 10 hours, and fired. Then, under a condition of 5° C./min, the temperature was lowered to room temperature and the crucible was then removed, and the content was washed with deionized water. Finally, drying was performed at 150° C. for 2 hours, and 98.0 g of a blue α-alumina powder containing molybdenum was obtained. Polyhedral alumina particles having a $D_{50}$ value of 5 µm were obtained.

Then, 5.0 g of a sample of polyhedral alumina particles coated with titanium oxide was obtained in the same manner as in Example 1 except that the polyhedral alumina particles having a $D_{50}$ value of 5 µm were used.

Example 17

Polyhedral alumina particles having a $D_{50}$ value of 5 µm were produced in the same production method as in Example 16.

5.0 g of a sample of polyhedral alumina particles coated with iron oxide(III) was obtained in the same manner as in Example 2 except that the polyhedral alumina particles having a $D_{50}$ value of 5 µm were used. The color of these composite particles was reddish brown.

Comparative Example 1

5.0 g of a sample of polyhedral alumina particles coated with iron oxide(III) was obtained in the same manner as in Example 2 except that commercially available alumina particles having a $D_{50}$ value of 30 µm (product name "A-SF-60" commercially available from Zhengzhou Research institute of Chalco) were used. The color of these composite particles was light red.

TABLE 1

|  |  | Example 1 | Example 2 | Example 3 | Example 4 | Example 5 | Example 6 | Example 7 |
|---|---|---|---|---|---|---|---|---|
| Alumina particles | Presence of mullite on the surface of particles |  | Present |  | Present |  |  | Present |
|  | Presence of Mo on the surface of particles |  | Present |  | Present |  |  | Present |

TABLE 1-continued

| | | | | | | | | |
|---|---|---|---|---|---|---|---|---|
| | Major diameter L (μm)(=$D_{50}$) | 5 | | 13 | | | | 28 |
| | Thickness D (μm) | 0.4 | | 0.4 | | | | 0.6 |
| | Aspect ratio (L/D) | 12.5 | | 32.5 | | | | 46.7 |
| Coating conditions | Inorganic coating layer | $TiO_2$ | $Fe_2O_3$ | $TiO_2$ | | $Fe_2O_3$ | | $TiO_2$ |
| | Time for which $TiCl_4$ solution is added dropwise (h) | 8 | — | 8 | — | — | — | 8 |
| | Time for which $FeCl_3$ solution is added dropwise (h) | — | 2 | — | 2 | 4 | 7 | — |
| | Temperature (°C.) | 70 | 75 | 70 | 75 | 75 | 75 | 70 |
| | pH | 1.8 | 2.7 | 1.8 | 2.7 | 2.7 | 2.7 | 1.8 |
| Composite particles | Theoretical coating rate (%) | 12 | 11 | 12 | 11 | 22 | 38 | 12 |
| | XRF coating rate (%) | 10 | 11 | 9.5 | 9 | 20.5 | 36 | 10.8 |
| | Coating efficiency (%) | 83.3 | 100.0 | 79.2 | 81.8 | 93.2 | 94.7 | 90.0 |
| | Evaluation | A | A | C | B | A | A | A |

| | | Example 8 | Example 9 | Example 10 | Example 11 | Example 12 | Example 13 |
|---|---|---|---|---|---|---|---|
| Alumina particles | Presence of mullite on the surface of particles | | | Present | | | Not present |
| | Presence of Mo on the surface of particles | | | Present | | | Present |
| | Major diameter L (μm)(=$D_{50}$) | | | 28 | | | 22 |
| | Thickness D (μm) | | | 0.6 | | | 0.6 |
| | Aspect ratio (L/D) | | | 46.7 | | | 36.7 |
| Coating conditions | Inorganic coating layer | | | $Fe_2O_3$ | | | $TiO_2$ |
| | Time for which $TiCl_4$ solution is added dropwise (h) | — | — | — | — | — | 8 |
| | Time for which $FeCl_3$ solution is added dropwise (h) | 1 | 2 | 4 | 7 | 11 | — |
| | Temperature (°C.) | 75 | 75 | 75 | 75 | 75 | 70 |
| | pH | 2.7 | 2.7 | 2.7 | 2.7 | 2.7 | 1.8 |
| Composite particles | Theoretical coating rate (%) | 5.4 | 11 | 22 | 38 | 60 | 12 |
| | XRF coating rate (%) | 5.1 | 10.9 | 21.5 | 37.3 | 55 | 10.5 |
| | Coating efficiency (%) | 94.4 | 99.1 | 97.7 | 98.2 | 91.7 | 87.5 |
| | Evaluation | A | A | A | A | A | B |

TABLE 2

| | | Example 14 | Example 15 | Example 16 | Example 17 | Comparative Example 1 |
|---|---|---|---|---|---|---|
| Alumina particles | Presence of mullite on the surface of particles | Not present | Not present | Not present | | Not present |
| | Presence of Mo on the surface of particles | Present | Present | Present | | Not present |
| | Major diameter L (μm)(=$D_{50}$) | 50 | 50 | 5 | | 30 |
| | Thickness D (μm) | 2 | — | — | | — |
| | Aspect ratio (L/D) | 25 | — | — | | — |
| Coating conditions | Inorganic coating layer | $TiO_2$ | $TiO_2$ | $TiO_2$ | $Fe_2O_3$ | $Fe_2O_3$ |
| | Time for which TiCl4 solution is added dropwise (h) | 8 | 8 | 8 | — | — |
| | Time for which FeCl3 solution is added dropwise (h) | — | — | — | 2 | 2 |
| | Temperature (°C.) | 70 | 70 | 70 | 75 | 75 |
| | pH | 1.8 | 1.8 | 1.8 | 2.7 | 2.7 |
| Composite particles | Theoretical coating rate (%) | 12 | 12 | 12 | 11 | 11.1 |
| | XRF coating rate (%) | 4 | 10.8 | 11 | 3.83 | 0.26 |
| | Coating efficiency (%) | 33.3 | 90.0 | 91.7 | 34.8 | 2.30 |
| | Evaluation | C | A | A | C | D |

<<Evaluation>>

The samples of the powders of composite particles of Examples 1 to 17, and Comparative Example 1, as well as alumina particles obtained in Examples 1, 3, 7, 13 to 16, and alumina particles used in Comparative Example 1, were subjected to the following evaluations. The measurement methods are as follows.

[Measurement of Major Diameter L of Alumina Particle]

A laser diffraction particle size measuring device (SALD-7000, commercially available from Shimadzu Corporation) was used, 1 mg of alumina powder was dispersed in a 0.2 wt % sodium hexametaphosphate (commercially available from FUJIFILM Wako Pure Chemical Corporation) aqueous solution so that a total of 18 g was obtained, and this was used as a sample for measurement and the average particle size $D_{50}$ value (μm) was determined as the major diameter L.

[Measurement of Thickness D of Alumina Particles]

An average value obtained by measuring thicknesses at 50 locations using a scanning electron microscope (SEM) was determined as a thickness D (μm).

[Aspect Ratio L/D]

The aspect ratio was determined using the following formula:

Aspect Ratio=Major Diameter $L$ of Alumina Particle/ Thickness $D$ of Alumina Particle.

[Determination of Presence or Absence of Mullite on the Surface of Alumina Particles]

An inorganic coating layer of composite particles was dissolved using hot concentrated sulfuric acid in the case of titanium oxide and using sulfuric acid in the case of iron oxide(III), to expose alumina particles, and the produced sample was placed on a measurement sample holder having a depth of 0.5 mm and filled so that it was flattened with a certain load, and this was set in a wide angle X-ray diffraction (XRD) device (Ultima IV, commercially available from Rigaku Corporation), and measurement was performed under conditions of Cu/Kα rays, 40 kV/30 mA, a scan speed of 2 degree/min, and a scan range of 10 to 70 degrees.

The peak height of mullite observed at 2θ=26.2±0.2 degrees was set as A, the peak height of α-alumina on the (104) plane observed at 2θ=35.1±0.2 degrees was set as B, and the base line value at 2θ=30±0.2 degrees was set as C, and it was determined whether there was mullite according to the following formula.

When the value of R was 0.02 or more, it was determined that mullite was "present" on the surface of the alumina particles, and when the value of R was less than 0.02, it was determined that mullite was "not present" on the surface of the alumina particles. As shown in the following formula, R is a ratio of the height A of the peak of mullite to the height B of the peak on the (104) plane of α-alumina.

$R=(A-C)/(B-C)$

[Determination of the amount of Mo on the surface of the alumina particles]

The produced sample was fixed onto a double-sided tape by pressing and composition analysis was performed using an X-ray photoelectron spectroscopic (XPS) device (Quantera SXM, commercially available from ULVAC-PHI, Inc.) under the following conditions.

X-ray source: monochromatic AlKα, beam diameter 100 μmφ, output 25 W
Measurement: area measurement (1,000 μm square), n=3
Charging correction: C1s=284.8 eV

[Mo]/[Al] obtained from XPS analysis results was set as an amount of Mo on the surface of the alumina particles.

When the amount of Mo was 0.0005 or more, it was determined that Mo was "present" on the surface of the alumina particles, and when the amount of Mo was less than 0.0005, it was determined that Mo was "not present" on the surface of the alumina particles.

[Theoretical Coating Rate]

The theoretical coating rate (%) of composite particles was calculated from the ratio between the charging mass of $Fe_2O_3$ or $TiO_2$, and the charging mass of alumina (inorganic coating layer mass/alumina mass). The charging mass of $Fe_2O_3$ and $TiO_2$ can be obtained from charging amounts of $FeCl_3$ and $TiCl_4$, respectively.

[XRF Coating Rate]

About 70 mg of the produced sample was placed on a filter paper and coated with a PP film, and composition analysis was performed using an X-ray fluorescence (XRF) analyzing device (Primus IV, commercially available from Rigaku Corporation).

The XRF coating rate (%) of composite particles was determined from $[TiO_2]/[Al_2O_3]$ or $[Fe_2O_3]/[Al_2O_3]$(mass ratio) obtained from XRF analysis results.

[Coating Efficiency]

The coating efficiency (%) of composite particles was obtained from the ratio of the XRF coating rate to the above theoretical coating rate.

[Coating Evaluation]

When the coating efficiency (%) of composite particles was 90% or more, this was evaluated as very good "A" when the coating efficiency (%) was 80% or more and less than 90%, this was evaluated as good "B" when the coating efficiency (%) was 30% or more and less than 80%, this was evaluated as almost good "C" and when the coating efficiency (%) was less than 30%, this was evaluated as poor "D." The evaluation results are shown in Table 1 and Table 2.

First, as shown in Table 1, in the powders obtained in Examples 1 to 12, it was confirmed that the value of the XRD peak intensity ratio was 0.02 or more and there was mullite. On the other hand, in the powders obtained in Examples 13 to 17, the presence of mullite was not confirmed.

In addition, it was confirmed that the powders obtained in Examples 1 to 17 and Comparative Example 1 had values of the particle size ($D_{50}$), the thickness, and the aspect ratio described in Table 1.

SEM observation images of the plate-like alumina particles of Example 1 are shown in FIG. 1 and FIG. 2.

As shown in FIG. 1 and FIG. 2, it was confirmed that the surface of the plate-like alumina of Example 1 was coated with particulate titanium oxide ($TiO_2$).

SEM observation images of the plate-like alumina particles of Example 2 are shown in FIG. 3 to FIG. 5.

As shown in FIG. 3 to FIG. 5, it was confirmed that the surface of the plate-like alumina of Example 2 was coated with particulate iron oxide (III) ($Fe_2O_3$).

In addition, in the composite particles of Examples 1 to 12, the plate-like alumina particles having a $D_{50}$ value of 5 μm, 13 μm or 28 μm was used, and the presence of Mo and Si on the surface of the plate-like alumina was confirmed, and the presence of mullite on the surface of the plate-like alumina was confirmed. Thus, when an inorganic coating layer was formed of titanium oxide or iron oxide(III), the coating efficiency was 80% or more in any case and this was good or very good. Therefore, it was found that, when Mo and mullite were present on the surface of the plate-like alumina, it was easy to form both the inorganic coating layers of titanium oxide and iron oxide(III) on the plate-like alumina. In particular, in Examples 2, 5, 6, and 8 to 12, when an inorganic coating layer was formed of iron oxide(III), the coating efficiency was 90% or more in any case, and this was very good. Therefore, it was found that, when Mo and mullite were present on the surface of the plate-like alumina, it was very easy to form the inorganic coating layer of iron oxide(III) on the plate-like alumina. In addition, in Example 7, when an inorganic coating layer was formed of titanium oxide, the coating efficiency was 90% or more and this was very good. Therefore, it was found that, when Mo and mullite were present on the surface of the plate-like alumina, it was very easy to form the inorganic coating layer of titanium oxide on the plate-like alumina.

In the composite particles of Example 13, plate-like alumina particles having a $D_{50}$ value of 22 μm was used, and the presence of Mo on the surface of the plate-like alumina was confirmed. Thus, when an inorganic coating layer was formed of titanium oxide, the coating efficiency was at 87.5% or more and this was good. Therefore, it was found that, when Mo was present on the surface of the plate-like alumina, it was easy to form the inorganic coating layer of titanium oxide on the plate-like alumina.

In the composite particles of Example 14, plate-like alumina particles having a $D_{50}$ value of 50 μm was used, and the presence of Mo on the surface of the plate-like alumina was confirmed. Thus, when an inorganic coating layer was formed of titanium oxide, the coating efficiency was 33.3% and this was almost good. Therefore, it was found that, when Mo was present on the surface of the plate-like alumina, it was easy to form the inorganic coating layer of titanium oxide on the plate-like alumina.

In the composite particles of Example 15, polyhedral alumina particles having a $D_{50}$ value of 50 μm was used and the presence of Mo on the surface of the polyhedral alumina was confirmed. Thus, when an inorganic coating layer was formed of titanium oxide, the coating efficiency was 90% and this was very good. Therefore, it was found that, when Mo was present on the surface of the polyhedral alumina, it was very easy to form the inorganic coating layer of titanium oxide on the polyhedral alumina.

In the composite particles of Example 16, a polyhedral alumina particles having a $D_{50}$ value of 5 μm was used, and the presence of Mo on the surface of the polyhedral alumina was confirmed. Thus, when an inorganic coating layer was formed of titanium oxide, the coating efficiency was 91.7% and this was very good. Therefore, it was found that, when Mo was present on the surface of the polyhedral alumina, it was very easy to form the inorganic coating layer of titanium oxide on the polyhedral alumina.

In the composite particles of Example 17, a polyhedral alumina particles having a $D_{50}$ value of 5 μm was used, and the presence of Mo on the surface of the polyhedral alumina was confirmed. Thus, when an inorganic coating layer was formed of iron oxide(III), the coating efficiency was 34.8% and this was almost good. Therefore, it was found that, when Mo was present on the surface of the polyhedral alumina, it was easy to form the inorganic coating layer of titanium oxide on the polyhedral alumina.

In addition, in Examples 2, 4 to 6, 8 to 12, and 17 coated with iron oxide(III), it was confirmed that red or reddish brown was exhibited.

On the other hand, in the composite particles of Comparative Example 1, a commercially available plate-like alumina particles having a $D_{50}$ value of 30 μm was used, and it was confirmed that the plate-like alumina had an α-crystal structure according to the XRD measurement. In addition, the presence of Mo and Si on the surface of the plate-like alumina was not confirmed and the presence of mullite on the plate-like alumina was not confirmed. Thus, when an inorganic coating layer was formed of iron oxide (III), the coating efficiency was about 2.30% and this was poor.

INDUSTRIAL APPLICABILITY

Since the composite particles of the present invention have a high coating efficiency of the inorganic coating part, they can be appropriately used for printing inks, paints, automotive coatings, industrial coatings, thermally conductive fillers, cosmetic materials, polishing materials, high-brilliance pigments, lubricants, conductive powder substrates, ceramic materials, and the like.

The invention claimed is:

1. A composite particle comprising
an alumina particle comprising molybdenum (Mo) and
an inorganic coating part provided on a surface of the alumina particle,
wherein the alumina particle comprises mullite in a surface layer of the alumina particle;
wherein the alumina particle has a thickness is 0.01 μm or more and 5 μm or less;
wherein the alumina particle has a particle size is 0.1 μm or more and 500 μm or less;
wherein the alumina particle has an aspect ratio of 2 or more and 500 or less;
wherein a ratio of the height A of the peak of mullite to the height B on the (104) plane of α-alumina (R) is 0.02 or more;
wherein the inorganic coating part is made of an oxide or metal having a particle form,
and wherein a particle size of the oxide or metal having a particle form is 1 nm or more and 500 nm or less.

2. The composite particle according to claim 1,
wherein the inorganic coating part is made of an oxide.

3. The composite particle according to claim 2,
wherein the oxide includes one or more selected from the group consisting of titanium oxide, iron oxide and silica.

4. The composite particle according to claim 1,
wherein the inorganic coating part is made of a metal.

5. The composite particle according to claim 4,
wherein the metal include one or more selected from the group consisting of silver, nickel, copper, gold, and platinum.

6. The composite particle according to claim 1,
wherein the alumina particle further comprises one or more selected from the group consisting of silicon and germanium.

7. The composite particle according to claim 1,
wherein the composite particle has either a plate-like shape or a polyhedral shape.

8. The composite particle according to claim 2,
wherein the alumina particle further comprises one or more selected from the group consisting of silicon and germanium.

9. The composite particle according to claim 8,
wherein the alumina particle comprises mullite in a surface layer of the alumina particle.

10. The composite particle according to claim 4,
wherein the alumina particle further comprises one or more selected from the group consisting of silicon and germanium.

11. The composite particle according to claim 10,
wherein the alumina particle comprises mullite in a surface layer of the alumina particle.

12. The composite particle according to claim 2,
wherein the composite particle has either a plate-like shape or a polyhedral shape.

13. The composite particle according to claim 4,
wherein the composite particle has either a plate-like shape or a polyhedral shape.

* * * * *